US012572237B2

(12) United States Patent
Kim et al.

(10) Patent No.: US 12,572,237 B2
(45) Date of Patent: Mar. 10, 2026

(54) TOUCH DISPLAY DEVICE AND TOUCH DRIVING CIRCUIT

(71) Applicant: LG Display Co., Ltd., Seoul (KR)

(72) Inventors: HoonBae Kim, Paju-si (KR);
NamYong Gong, Paju-si (KR);
SungChul Kim, Paju-si (KR); SunYeop Kim, Paju-si (KR); SungYub Lee, Paju-si (KR); Jongsung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/920,689

(22) Filed: Oct. 18, 2024

(65) Prior Publication Data

US 2025/0156008 A1 May 15, 2025

(30) Foreign Application Priority Data

Nov. 15, 2023 (KR) ........................ 10-2023-0158168

(51) Int. Cl.
*G06F 3/041* (2006.01)
*G06F 3/044* (2006.01)

(52) U.S. Cl.
CPC ...... *G06F 3/041661* (2019.05); *G06F 3/0445* (2019.05); *G06F 3/0446* (2019.05); *G06F 2203/04108* (2013.01); *G06F 2203/04111* (2013.01)

(58) Field of Classification Search
CPC ............. G06F 3/041661; G06F 3/0445; G06F 3/0446; G06F 2203/04108; G06F 2203/04111
See application file for complete search history.

(56) References Cited

U.S. PATENT DOCUMENTS

| | | | |
|---|---|---|---|
| 2017/0192608 A1 | 7/2017 | Jang et al. | |
| 2020/0264726 A1 | 8/2020 | Kim et al. | |
| 2020/0341610 A1 | 10/2020 | Quintana et al. | |
| 2021/0232256 A1* | 7/2021 | Kim ...................... | G06F 3/0412 |
| 2022/0179520 A1 | 6/2022 | Jeon et al. | |

FOREIGN PATENT DOCUMENTS

| | | |
|---|---|---|
| CN | 104035227 A | 9/2014 |
| JP | 2011-528828 A | 11/2011 |
| JP | 2016-540302 A | 12/2016 |
| JP | 2017-102810 A | 6/2017 |
| JP | 2018-60327 A | 4/2018 |
| JP | 2018-142270 A | 9/2018 |

(Continued)

*Primary Examiner* — Deeprose Subedi
(74) *Attorney, Agent, or Firm* — Birch, Stewart, Kolasch & Birch, LLP

(57) ABSTRACT

A touch display device and a touch driving circuit are discussed. An operation period of the touch display device can include a first touch sensing mode period in which a first touch driving signal having a first amplitude is applied to the touch sensor, and a second touch sensing mode period in which a second touch driving signal having a second amplitude different from the first amplitude is applied to the touch sensor. The first touch driving signal can be sequentially applied to each of a plurality of first touch electrodes during the first touch sensing mode period, and, during the second touch sensing mode period.

19 Claims, 22 Drawing Sheets

(56)　　　　　　　References Cited

FOREIGN PATENT DOCUMENTS

| | | | |
|---|---|---|---|
| JP | 2018-181151 | A | 11/2018 |
| JP | 2023-58015 | A | 4/2023 |
| KR | 10-2182979 | B1 | 11/2020 |
| KR | 10-2021-0103827 | A | 8/2021 |
| WO | WO 2012/147634 | A1 | 11/2012 |

* cited by examiner

Figure 5:
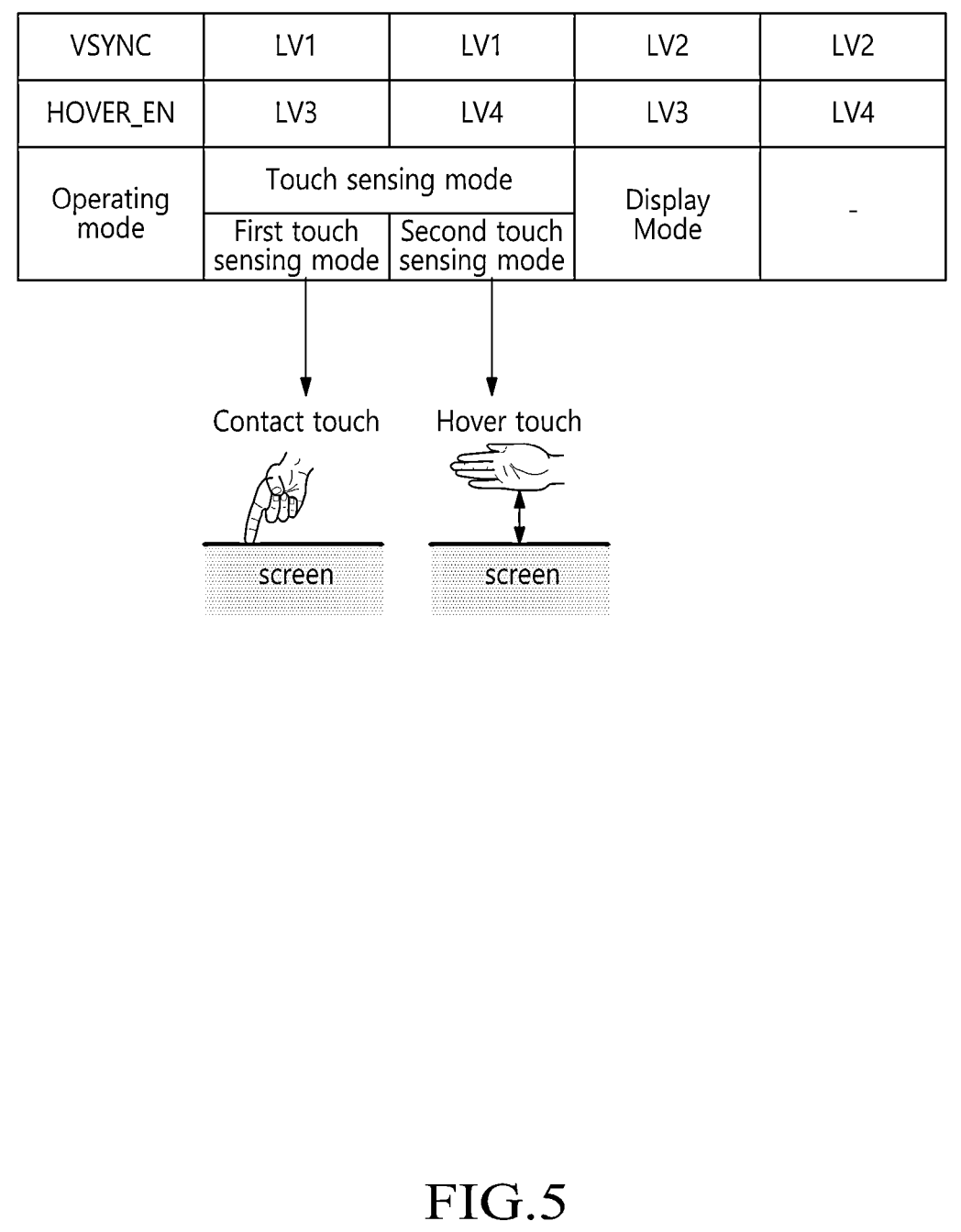

| VSYNC | LV1 | LV1 | LV2 | LV2 |
|---|---|---|---|---|
| HOVER_EN | LV3 | LV4 | LV3 | LV4 |
| Operating mode | Touch sensing mode | | Display Mode | - |
| | First touch sensing mode | Second touch sensing mode | | |

Contact touch     Hover touch screen     screen

TDS1

TE2

TE1

Sensing

Tt22

Self-sensing TE2

TOUCH DISPLAY DEVICE AND TOUCH DRIVING CIRCUIT

CROSS-REFERENCE TO RELATED APPLICATION

This application claims priority to Korean Patent Application No. 10-2023-0158168, filed in the Republic of Korea on Nov. 15, 2023, the entire contents of which is hereby expressly incorporated by reference into the present application.

BACKGROUND

Field

Embodiments of the present disclosure relate to a touch display device, a touch driving circuit, and a touch controller.

Discussion of the Related Art

Recently, there has been developed a touch display device capable of detecting a touch by a user's finger or pen and providing touch-based input processing functions.

In order for this touch display device to provide more various application functions, there is a demand for various forms of touch sensing. For example, a wearable device can require not only a function of sensing a contact touch in the form of a user touching the screen, but also a function to sense a non-contact touch (e.g., a hover touch) in the form of a user not touching the screen.

SUMMARY OF THE DISCLOSURE

Embodiments of the present disclosure can provide a touch display device, a touch driving circuit and a touch controller capable of supporting various touch sensing modes.

Embodiments of the present disclosure can provide a touch display device, a touch driving circuit and a touch controller capable of efficiently sensing a contact touch and a hover touch.

Embodiments of the present disclosure can provide a touch display device, a touch driving circuit and a touch controller having a circuit structure and a control structure capable of efficiently sensing a contact touch and a hover touch.

Embodiments of the present disclosure can provide a touch display device, a touch driving circuit and a touch controller having a control signal system capable of efficiently supporting a display mode, a contact touch sensing mode, and a hover touch sensing mode.

A touch display device according to embodiments of the present disclosure can include a touch sensor including a plurality of first touch electrodes and a plurality of second touch electrodes, and a touch driving circuit for driving the touch sensor.

According to aspects of the present disclosure, an operating mode of the touch display device can include a display mode and a touch sensing mode. The display mode and the touch sensing mode can be switched with each other or can be performed simultaneously.

According to aspects of the present disclosure, the touch sensing mode can include a first touch sensing mode and a second touch sensing mode. The first touch sensing mode and the second touch sensing mode can be performed in temporally separated time periods. For example, the first touch sensing mode and the second touch sensing mode may not temporally overlap with each other.

According to aspects of the present disclosure, an operation period of the touch display device can include a first touch sensing mode period in which a first touch driving signal having a first amplitude is applied to the touch sensor, and a second touch sensing mode period in which a second touch driving signal having a second amplitude different from the first amplitude is applied to the touch sensor.

According to aspects of the present disclosure, the first touch driving signal can be applied sequentially or simultaneously to the plurality of first touch electrodes during the first touch sensing mode period.

According to aspects of the present disclosure, during the second touch sensing mode period, the second touch driving signal can be simultaneously applied to two or more first touch electrodes electrically connected to each other among the plurality of first touch electrodes, or the second touch driving signal can be simultaneously applied to two or more second touch electrodes electrically connected to each other among the plurality of second touch electrodes.

For example, the first touch sensing mode period can be a period for sensing a contact touch which contacts a screen, and the second touch sensing mode period can be a period for sensing a hover touch which does not contact the screen.

According to aspects of the present disclosure, the second amplitude of the second touch driving signal in the second touch sensing mode period can be greater than the first amplitude of the first touch driving signal in the first touch sensing mode period.

According to aspects of the present disclosure, the second touch sensing mode period can include a first sub-sensing period and a second sub-sensing period which do not overlap with each other.

According to aspects of the present disclosure, during the first sub-sensing period of the second touch sensing mode period, the second touch driving signal can be simultaneously applied to two or more first touch electrodes electrically connected to each other among the plurality of first touch electrodes.

According to aspects of the present disclosure, during the second sub-sensing period of the second touch sensing mode period, the second touch driving signal can be simultaneously applied to two or more second touch electrodes electrically connected to each other among the plurality of second touch electrodes.

The touch display device according to embodiments of the present disclosure can include a display panel including a plurality of subpixels and a plurality of touch electrodes, a display driving circuit for driving the plurality of subpixels, a touch driving circuit for supplying a touch driving signal to at least one of the plurality of touch electrodes, a display controller for controlling the display driving circuit and supplying a first mode control signal to a touch controller, and the touch controller for supplying a second mode control signal to the touch driving circuit.

According to aspects of the present disclosure, an operation period of the touch display device can include a display mode period and a touch sensing mode period, and the touch sensing mode period can include a first touch sensing mode period and a second touch sensing mode period.

According to aspects of the present disclosure, the display mode period, the first touch sensing mode period and the second touch sensing mode period can be distinguished by the first mode control signal and the second mode control signal.

For example, the first mode control signal can include a first signal section having a first level voltage and a second signal section having a second level voltage different from the first level voltage, and the second mode control signal can include a third signal section having a third level voltage and a fourth signal section having a fourth level voltage different from the third level voltage.

For example, during the display mode period, the first mode control signal can have the second level voltage and the second mode control signal can have the third level voltage, For example, during the first touch sensing mode period, the first mode control signal can have the first level voltage and the second mode control signal can have the third level voltage.

For example, during the second touch sensing mode period, the first mode control signal can have the first level voltage and the second mode control signal can have the fourth level voltage.

For example, the first mode control signal can be a control signal for dividing the operation period into the display mode period and the touch sensing mode period, and the second mode control signal can be a control signal for dividing the touch sensing mode period into the first touch sensing mode period and the second touch sensing mode period.

For example, the first mode control signal can be a vertical synchronization signal for dividing one display frame period into an active period and a blank period. The active period can be a display mode period and the blank period can be a touch sensing mode period.

A touch driving circuit according to embodiments of the present disclosure can include two or more amplifiers corresponding to a plurality of first touch electrodes, two or more charge amplifiers corresponding to a plurality of second touch electrodes and each including a feedback capacitor, a first control switch circuit which controls all or part of the plurality of first touch electrodes to be connected to all or part of the two or more amplifiers, or controls all or part of the plurality of first touch electrodes to be connected to all or part of the two or more charge amplifiers, or controls the plurality of first touch electrodes to be separated from the two or more amplifiers and the two or more charge amplifiers, and a second control switch circuit which controls all or part of the plurality of second touch electrodes to be connected to all or part of the two or more charge amplifiers, or controls all or part of the plurality of second touch electrodes to be separated from the two or more charge amplifiers.

According to aspects of the present disclosure, an operation period of the touch driving circuit can include a first touch sensing mode period and a second touch sensing mode period which do not overlap with each other, and the second touch sensing mode period can include a first sub-sensing period and a second sub-sensing period which do not overlap with each other.

According to aspects of the present disclosure, during the first sub-sensing period, two or more first touch electrodes among the plurality of first touch electrodes can be electrically connected to each other. During the second sub-sensing period, two or more second touch electrodes among the plurality of second touch electrodes can be electrically connected to each other.

According to aspects of the present disclosure, during the first touch sensing mode period, the first control switch circuit can sequentially connect the two or more first touch electrodes and the two or more amplifiers in correspondence with each other, and the second control switch circuit can connect the two or more second touch electrodes and the two or more charge amplifiers in correspondence with each other.

According to aspects of the present disclosure, the second touch sensing mode period can include a first sub-sensing period and a second sub-sensing period which do not overlap with each other.

According to aspects of the present disclosure, during the first sub-sensing period, the first control switch circuit can connect the two or more first touch electrodes to a specific charge amplifier among the two or more charge amplifiers, and the second control switch circuit can separate the two or more second touch electrodes from the two or more charge amplifiers.

According to aspects of the present disclosure, during the second sub-sensing period, the first control switch circuit can separate the two or more first touch electrodes from the two or more amplifiers and the two or more charge amplifiers, and the second control switch circuit can connect the two or more second touch electrodes to the specific charge amplifier.

According to aspects of the present disclosure, each of the two or more charge amplifiers can further include an operational amplifier including a first input node, a second input node and an output node.

According to aspects of the present disclosure, the feedback capacitor can be connected between the second input node and the output node.

According to aspects of the present disclosure, the specific charge amplifier can further include an additional feedback capacitor and a capacitance control switch connected between the second input node and the output node.

A touch driving circuit according to embodiments of the present disclosure can include a first signal input unit configured to receive a reference touch driving signal and a touch mode control signal, and a first signal output unit configured to output a first touch driving signal having a first amplitude or a second touch driving signal having a second amplitude different from the first amplitude to a touch sensor based on the reference touch driving signal and the touch mode control signal.

According to aspects of the present disclosure, the touch mode control signal can have a first level voltage or a second level voltage.

According to aspects of the present disclosure, if the touch mode control signal has a first level voltage, at one point in time, the first touch driving signal can be applied to N touch electrodes among a plurality of touch electrodes included in the touch sensor.

According to aspects of the present disclosure, if the touch mode control signal has a second level voltage, at one point in time, the second touch driving signal can be simultaneously applied to M touch electrodes, which are more than N, among a plurality of touch electrodes included in the touch sensor.

A touch controller for controlling a touch sensing operation of a touch display device according to embodiments of the present disclosure can include a second signal input unit configured to receive a first mode control signal from a display controller, and a second signal output unit configured to output a reference touch driving signal and output a second mode control signal generated based on the first mode control signal.

According to aspects of the present disclosure, the first mode control signal can include a first signal section having a first level voltage and a second signal section having a second level voltage different from the first level voltage.

According to aspects of the present disclosure, if the first mode control signal is a second signal section having a second level voltage, the second mode control signal can have a third level voltage.

According to aspects of the present disclosure, if the first mode control signal is a first signal section having a first level voltage, the second mode control signal can include a signal section having a third level voltage and a signal section having a fourth level voltage different from the third level voltage.

According to embodiments of the present disclosure, it is possible to provide a touch display device, a touch driving circuit and touch controller capable of supporting a plurality of touch sensing modes.

According to embodiments of the present disclosure, it is possible to provide a touch display device, a touch driving circuit and touch controller capable of efficiently sensing a contact touch and a hover touch.

According to embodiments of the present disclosure, it is possible to provide a touch display device, a touch driving circuit and touch controller having a circuit structure and a control structure capable of efficiently sensing a contact touch and a hover touch.

According to embodiments of the present disclosure, it is possible to provide a touch display device, a touch driving circuit and touch controller having a control signal system capable of efficiently supporting a display mode, a contact touch sensing mode, and a hover touch sensing mode.

According to embodiments of the present disclosure, it is possible to provide a touch display device, a touch driving circuit and touch controller capable of low-power operation by efficiently performing a display driving, a contact touch sensing, and a hover touch sensing in terms of driving time.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

FIG. 5 illustrates an operating mode definition table of a touch display device according to embodiments of the present disclosure.

DETAILED DESCRIPTION OF THE EMBODIMENTS

Figure 1:
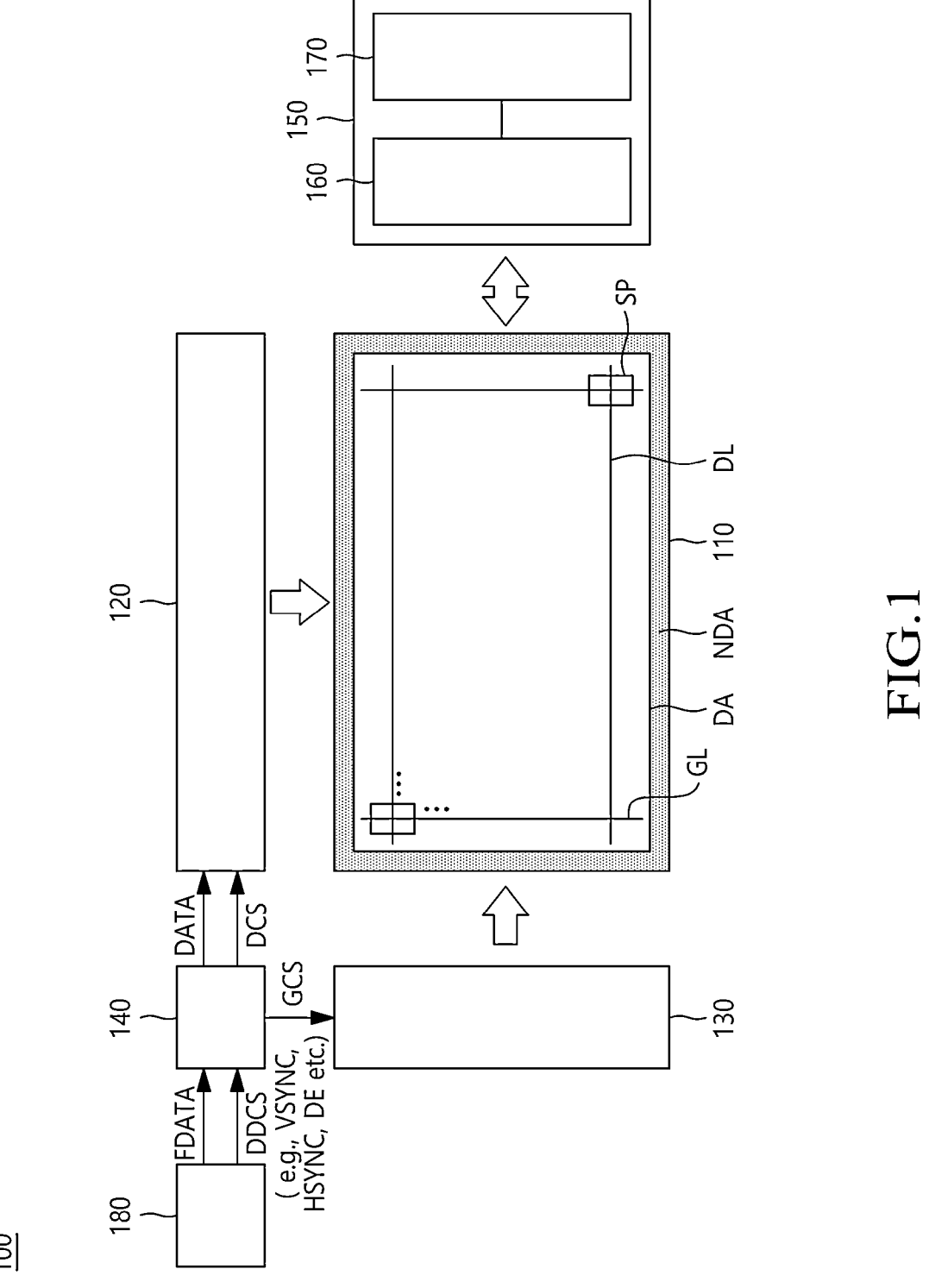
FIG. 1 is a system configuration diagram of a display device according to embodiments of the present disclosure.

Hereinafter, embodiments of the disclosure are described in detail with reference to the accompanying drawings. In assigning reference numerals to components of each drawing, the same components can be assigned the same numerals even when they are shown on different drawings. When determined to make the subject matter of the disclosure unclear, the detailed of the known art or functions can be skipped. As used herein, when a component "includes," "has," or "is composed of" another component, the component can add other components unless the component "only" includes, has, or is composed of" the other component. As used herein, the singular forms "a", "an" and "the" are intended to include the plural forms as well, unless the context clearly indicates otherwise.

Such denotations as "first," "second," "A," "B," "(a)," and "(b)," can be used in describing the components of the disclosure. These denotations are provided merely to distinguish a component from another, and the essence, sequence, order, or number of the components are not limited by the denotations.

In describing the positional relationship between components, when two or more components are described as "connected", "coupled" or "linked", the two or more components can be directly "connected", "coupled" or "linked", or another component can intervene. Here, the other component can be included in one or more of the two or more components that are "connected", "coupled" or "linked" to each other.

When such terms as, e.g., "after", "next to", "after", and "before", are used to describe the temporal flow relationship related to components, operation methods, and fabricating methods, it can include a non-continuous relationship unless the term "immediately" or "directly" is used.

When a component is designated with a value or its corresponding information (e.g., level), the value or the corresponding information can be interpreted as including a tolerance that can arise due to various factors (e.g., process factors, internal or external impacts, or noise). Further, the term "can" fully encompasses all the meanings and coverages of the term "may."

Hereinafter, various embodiments of the disclosure are described in detail with reference to the accompanying drawings. All the components of each display device according to all embodiments of the present disclosure are operatively coupled and configured.

FIG. 1 is a system configuration diagram of a display device 100 according to embodiments of the present disclosure.

Referring to FIG. 1, the display device 100 according to embodiments of the present disclosure can include, as components for displaying images, a display panel 110 and a display driving circuit.

The display driving circuit can be a circuit for driving a display panel 110, and can include a data driving circuit 120 and a gate driving circuit 130, and can further include a display controller 140.

The display panel 110 can include a display area DA (or active area) where an image is displayed and a non-display area NDA (or non-active area) where an image is not displayed. The non-display area NDA can be an outer area of the display area DA, and can also be referred to as a bezel area. The non-display area NDA can surround the display area DA entirely or only in part(s). All or part of the non-display area NDA can be an area visible from the front of the touch display device 100, or can be an area which is bent and not visible from the front of the touch display device 100.

The display panel 110 can include a plurality of subpixels SP and various types of signal lines for driving the plurality of subpixels SP.

The various types of signal lines can include a plurality of data lines DL which transmit data signals (also referred to as data voltages or image signals) and a plurality of gate lines GL which transmit gate signals (also referred to as scanning signals).

A plurality of data lines DL and a plurality of gate lines GL can intersect each other. Each of the plurality of gate lines GL can be arranged while extending in a first direction. Each of the plurality of data lines DL can be arranged while extending in a second direction. Here, the first direction can be a row direction and the second direction can be a column direction. Alternatively, the first direction can be a column direction and the second direction can be a row direction.

The data driving circuit 120 is a circuit for driving a plurality of data lines DL, and can output the data signal to the plurality of data lines DL. The gate driving circuit 130 is a circuit for driving a plurality of gate lines GL, and can output the gate signal to the plurality of gate lines GL.

The display controller 140 can receive input data FDATA and a display driving control signal DDCS from a host system 180. For example, the display driving control signal DDCS can include a vertical synchronization signal VSYNC, a horizontal synchronization signal HSYNC, and a data enable signal DE. Here, the horizontal synchronization signal is a signal representing a time taken to display one horizontal line of a screen and the vertical synchronization signal is a signal representing a time taken to display a screen of one frame. The data enable signal may correspond to a signal indicating a period for which a data voltage is supplied to the pixel.

The display controller 140 can supply image data DATA to the data driving circuit 120 based on the input data FDATA. In addition, the display controller 140 can be a device for controlling the data driving circuit 120 and the gate driving circuit 130, and can control the driving timing for a plurality of data lines DL and the driving timing for a plurality of gate lines GL. The display controller 140 can supply a data driving control signal DCS to the data driving circuit 120 to control the data driving circuit 120, and can supply a gate driving control signal GCS to the gate driving circuit 130 to control the gate driving circuit 130.

The data driving circuit 120 can supply a data signal to a plurality of data lines DL according to the driving timing control of the display controller 140. The data driving circuit 120 can receive image data DATA in digital form from the display controller 140, convert the received image data DATA into data signals in analog form, and output the converted image data to a plurality of data lines DL.

The gate driving circuit 130 can supply a gate signal to a plurality of gate lines GL according to the timing control of the display controller 140. The gate driving circuit 130 can receive a first gate voltage corresponding to a turn-on level voltage and a second gate voltage corresponding to a turn-off level voltage together with various gate driving control signals GCS, generate the gate signal, and supply the generated gate signal to a plurality of gate lines GL. For example, the first gate voltage can be a voltage higher than the second gate voltage. Alternatively, the second gate voltage can be a voltage higher than the first gate voltage.

For example, the data driving circuit 120 can be connected to the display panel 110 by a tape automated bonding (TAB) method, or can be connected to a bonding pad of the display panel 110 by a chip-on-glass (COG) or chip-on-panel (COP) method, or can be connected to the display panel 110 by being implemented as a chip-on-film (COF) method.

For example, the gate driving circuit 130 can be connected to the display panel 110 using a tape automated bonding (TAB) method, or can be connected to a bonding pad of the display panel 110 using a chip-on-glass (COG) or chip-on-panel (COP) method, or can be connected to the display panel 110 according to a chip-on-film (COF) method. Alternatively, the gate driving circuit 130 can be a gate-in-panel (GIP) type, and can be formed in the non-display area NDA of the display panel 110. The gate driving circuit 130 can be disposed on or connected to the substrate SUB. For example, if the gate driving circuit 130 is of the GIP type, it can be disposed in the non-display area NDA of the substrate SUB. The gate driving circuit 130 can be connected to the substrate SUB in the case of a chip-on-glass (COG) type, chip-on-film (COF) type, etc.

Meanwhile, at least one of the data driving circuit 120 and the gate driving circuit 130 can be disposed in the display area DA. For example, at least one of the data driving circuit 120 and the gate driving circuit 130 can be disposed not to overlap with the subpixels SP, or can be disposed to partially or entirely overlap with the subpixels SP.

Depending on the driving method, panel design method, and panel shape, the data driving circuit 120 can be connected to one side of the display panel 110, can be connected to one side and the other side of the display panel 110, or can be connected along the side of the display panel 110.

Depending on the driving method, panel design method, and panel shape, the gate driving circuit 130 can be connected to one side of the display panel 110, can be connected to one side and the other side of the display panel 110, or can be connected along the side of the display panel 110.

The display controller 140 can be implemented as a separate component from the data driving circuit 120, or can be implemented as an integrated circuit integrated with the data driving circuit 120.

The display controller 140 can be a timing controller used in typical display technology, or can be a control device capable of further performing other control functions including a timing controller, or can be a control device different from the timing controller, or can be a control device other than a timing controller, or can be a circuit within the control device. The display controller 140 can be implemented with various circuits or electronic components, such as an integrated circuit (IC), a field programmable gate array (FPGA), an application specific integrated circuit (ASIC), or a processor.

The display controller 140 can be mounted on a printed circuit board, a flexible printed circuit, etc., and can be electrically connected to the data driving circuit 120 and the gate driving circuit 130 through a printed circuit board, a flexible printed circuit.

The display controller 140 can transmit and receive signals with the data driving circuit 120 according to one or more predetermined interfaces. For example, the interface can include a low voltage differential signaling (LVDS) interface, an embedded clock point-point interface (EPI) interface, or a serial peripheral interface (SPI).

The touch display device 100 can be a liquid crystal display device, or can be a self-luminous display device in which the display panel 110 emits light on its own. For example, the display panel 110 can be a liquid crystal display panel or a self-luminous display panel.

Meanwhile, the touch display device 100 according to the embodiments of the present disclosure can include a touch sensor and a touch sensing circuit 150 in order to provide a touch sensing function in addition to an image display function.

The touch sensing circuit 150 can detect whether a touch (e.g., finger touch, pen touch) has occurred by a touch object such as a finger or a pen by sensing the touch panel, or can detect a touch location.

The touch sensing circuit 150 can include a touch driving circuit 160 for driving and sensing the touch sensor to generate and output touch sensing data, and a touch controller 170 for detecting touch occurrence or detecting a touch location using the touch sensing data.

The touch sensor can include a plurality of touch electrodes. The plurality of touch electrodes can be electrically connected to the touch driving circuit 160 through a plurality of touch lines. The touch sensor will be described in more detail with reference to FIG. 2.

The touch driving circuit 160 and the touch controller 170 included in the touch sensing circuit 150 can be implemented as separate devices or as one device. In addition, the touch driving circuit 160 and the data driving circuit 120 can be implemented as separate devices or as one device.

For example, the touch driving circuit 160 can be implemented as a readout integrated circuit (ROIC). Alternatively, the touch driving circuit 160 and the data driving circuit 120 can be integrated and implemented as a source and readout integrated circuit (SRIC). The touch controller 170 can be implemented as a micro control unit (MCU).

The touch display device 100 can further include a power supply circuit for supplying various types of power to the display driving circuit and/or the touch sensing circuit 150.

The touch display device 100 according to the embodiments of the present disclosure can be a mobile terminal such as a smart phone or tablet, or a monitor or television (TV) of various sizes, but is not limited thereto, and can be a display of various types and sizes capable of displaying information or images.

Alternatively, the touch display device 100 according to the embodiments of the present disclosure can be a wearable device capable of being worn on the body, such as a smart watch.

Figure 2:
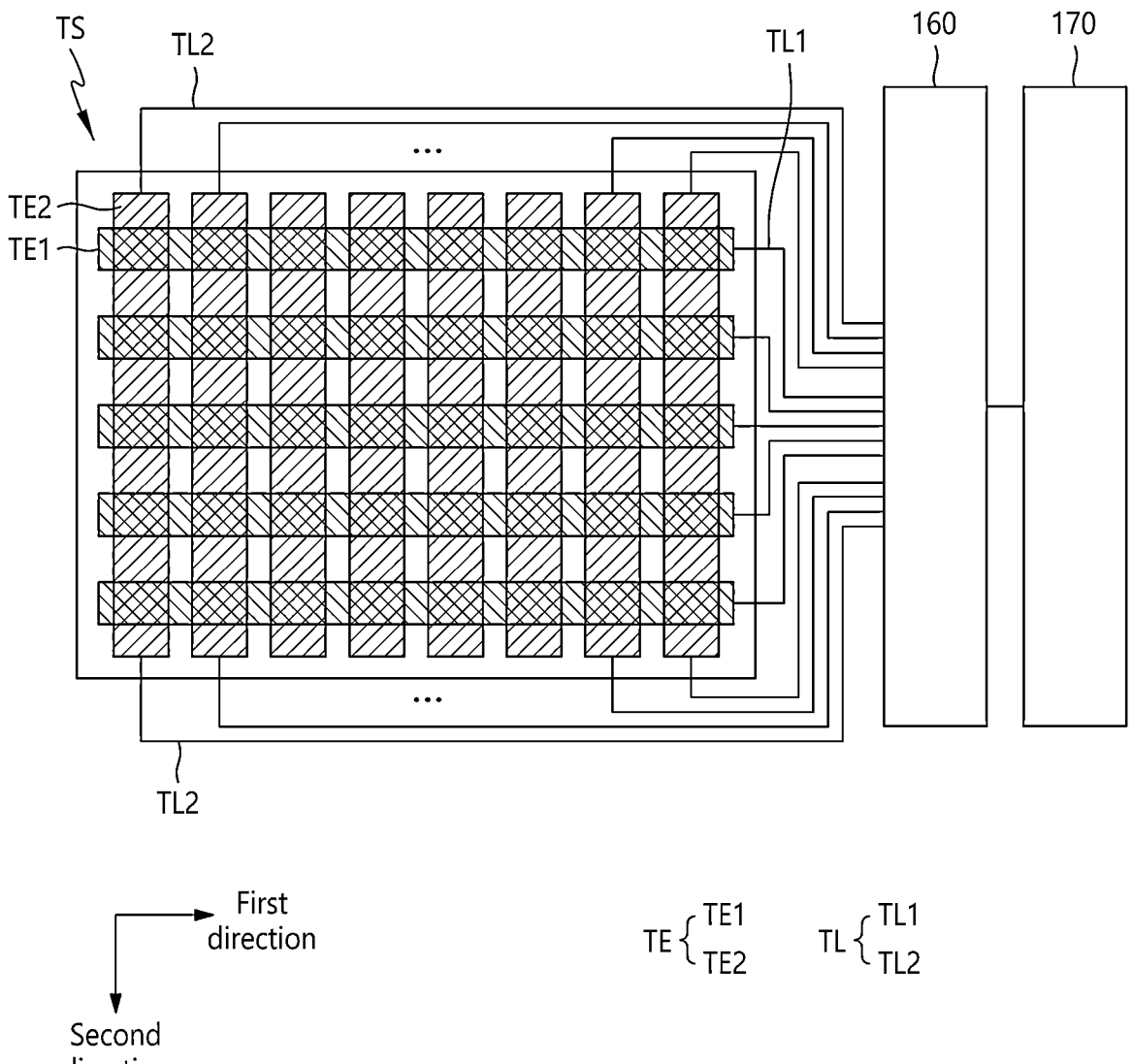
FIG. 2 illustrates a touch sensor of a touch display device according to embodiments of the present disclosure.

FIG. 2 illustrates a touch sensor TS of a touch display device 100 according to embodiments of the present disclosure.

Referring to FIG. 2, the touch driving circuit 160 can sense the touch sensor TS to generate touch sensing data as a sensing result and provide the touch sensing data to the touch controller 170.

The touch sensor TS can include a plurality of touch electrodes TE. The plurality of touch electrodes TE can be electrically connected to the touch driving circuit 160 through a plurality of touch lines TL.

The plurality of touch electrodes TE can include a plurality of first touch electrodes TE1 and a plurality of second touch electrodes TE2. For example, the plurality of first touch electrodes TE1 and the plurality of second touch electrodes TE2 can intersect each other. Each of the plurality of first touch electrodes TE1 can extend in a first direction, and each of the plurality of second touch electrodes TE2 can extend in a second direction. Accordingly, each of the plurality of first touch electrodes TE1 can overlap with the plurality of second touch electrodes TE2.

The plurality of first touch electrodes TE1 can be electrically connected to the touch driving circuit 160 through a plurality of first touch lines TL1, and the plurality of second touch electrodes TE2 can be electrically connected to the touch driving circuit 160 through a plurality of second touch lines TL2. For example, the touch driving circuit 160 may sense the touch sensor TS through a plurality of first touch lines TL1 and a plurality of second touch lines TL2 to generate touch sensing data as a sensing result and provide the touch sensing data to the touch controller 170.

The touch sensor TS can be implemented as a touch panel, and can exist separately on the outside of the display panel 110 or can exist inside the display panel 110.

The external touch sensor TS existing on the outside of the display panel 110 can be manufactured separately from the display panel 110 and then combined with the display panel 110 during an assembly process. The external touch sensor can be implemented as a touch panel including a substrate and a plurality of touch electrodes on the substrate.

An embedded touch sensor or a built-in touch sensor TS existing inside the display panel 110 can be formed together with the electrodes and lines related to display driving during the manufacturing process of the display panel 110. Hereinafter, for convenience of explanation, it is assumed that the touch sensor TS is an built-in touch sensor TS present inside the display panel 110.

The touch driving circuit 160 can supply a touch driving signal to at least one of the plurality of touch electrodes TE included in the touch sensor TS, and can sense at least one of the plurality of touch electrodes to generate touch sensing data. Here, the touch driving signal can be a signal whose voltage level changes or fluctuates.

The touch sensing circuit 150 can sense a touch using a mutual-capacitance sensing method or a self-capacitance sensing method.

In the case that the touch sensing circuit 150 performs touch sensing in a mutual-capacitance sensing method, the touch sensing circuit 150 can perform touch sensing based on a capacitance between the first touch electrode TE1 and the second touch electrode TE2.

According to the mutual-capacitance sensing method, the plurality of touch electrodes TE can be divided into driving a touch electrode (also referred to as a transmitting touch electrode) and a sensing touch electrode (also referred to as a receiving touch electrode). The touch driving circuit 160 can drive the driving touch electrodes and sense the sensing touch electrodes. Hereinafter, mutual-capacitance sensing can also be referred to as "mutual-sensing."

For example, during the mutual sensing, the plurality of first touch electrodes TE1 can be the driving touch electrodes (e.g., the transmitting touch electrodes), and the plurality of second touch electrodes TE2 can be the sensing touch electrodes (e.g., receiving touch electrodes). For another example, during the mutual sensing, the plurality of first touch electrodes TE1 can be the sensing touch electrodes (e.g., receiving touch electrodes) and the plurality of second touch electrodes TE2 can be the driving touch electrodes (e.g., transmitting touch electrodes). Hereinafter, for convenience of explanation, there is exemplified a case in which the plurality of first touch electrodes TE1 are the driving touch electrodes (e.g., transmitting touch electrodes) and the plurality of second touch electrodes TE2 are the sensing touch electrodes (e.g., receiving touch electrodes).

If the touch sensing circuit 150 performs touch sensing in a self-capacitance sensing method, the touch sensing circuit 150 can perform touch sensing based on the capacitance between each touch electrode TE and a touch object (e.g., a finger, a pen, etc.).

According to the self-capacitance sensing method, each of the plurality of touch electrodes TE can serve as a driving touch electrode and a sensing touch electrode. The touch driving circuit 160 can drive all or part of the plurality of touch electrodes TE and sense all or part of the plurality of touch electrodes TE. Hereinafter, self-capacitance sensing can also be referred to as "self-sensing."

For example, in self-sensing, the touch driving circuit 160 can supply a touch driving signal to at least one of the plurality of first touch electrodes TE1 and sense at least one first touch electrode TE1 to which the touch driving signal is supplied. The touch driving circuit 160 can supply a touch driving signal to at least one of the plurality of second touch electrodes TE2 and sense at least one second touch electrode TE2 to which the touch driving signal is supplied.

A first touch line TL1 can be connected to each of the plurality of first touch electrodes TE1. Alternatively, two first touch lines TL1 can be connected to each of the plurality of first touch electrodes TE1. In this case, the first touch line TL1 can be connected to each of one end and the other end of one first touch electrode TE1.

One second touch line TL2 can be connected to each of the plurality of second touch electrodes TE2. Alternatively, two second touch lines TL2 can be connected to each of the plurality of second touch electrodes TE2. In this case, the second touch line TL2 can be connected to each of one end and the other end of one second touch electrode TE2.

As an example, each of the plurality of first touch electrodes TE1 and the plurality of second touch electrodes TE2 can be in a bar shape.

As another example, each of the plurality of first touch electrodes TE1 and the plurality of second touch electrodes TE2 can be configured with a plurality of sub-electrodes which are electrically connected to each other by a bridge electrode.

As another example, each of the plurality of first touch electrodes TE1 can be formed integrally, and each of the plurality of second touch electrodes TE2 can be configured with a plurality of sub-electrodes which are electrically connected to each other by a bridge electrode.

As another example, each of the plurality of second touch electrodes TE2 can be formed integrally, and each of the plurality of first touch electrodes TE1 can be formed of a plurality of sub-electrodes electrically connected to each other by a bridge electrode.

For example, a plurality of first touch electrodes TE1 can be disposed in a first sensor metal layer, and a plurality of second touch electrodes TE2 can be disposed in a second sensor metal layer. Here, a sensor interlayer insulating film can be disposed between the first sensor metal layer and the second sensor metal layer.

As another example, if each of the plurality of first touch electrodes TE1 is formed integrally, and each of the plurality of second touch electrodes TE2 is composed of a plurality of sub-electrodes electrically connected to each other by bridge electrodes, the plurality of first touch electrodes TE1 and the plurality of sub-electrodes can be disposed in a sensor metal layer, and the bridge electrodes electrically connecting the plurality of sub-electrodes can be disposed in a bridge metal layer. Here, a sensor interlayer insulating film can be disposed between the sensor metal layer and the bridge metal layer.

As another example, if each of the plurality of second touch electrodes TE2 is formed integrally and each of the plurality of first touch electrodes TE1 is formed of a plurality of sub-electrodes electrically connected to each other by bridge electrodes, the plurality of second touch electrodes TE2 and the plurality of sub-electrodes can be disposed in a sensor metal layer, and the bridge electrodes electrically connecting the plurality of sub-electrodes can be disposed in a bridge metal layer. Here, a sensor interlayer insulating film can be disposed between the sensor metal layer and the bridge metal layer.

Figure 3:
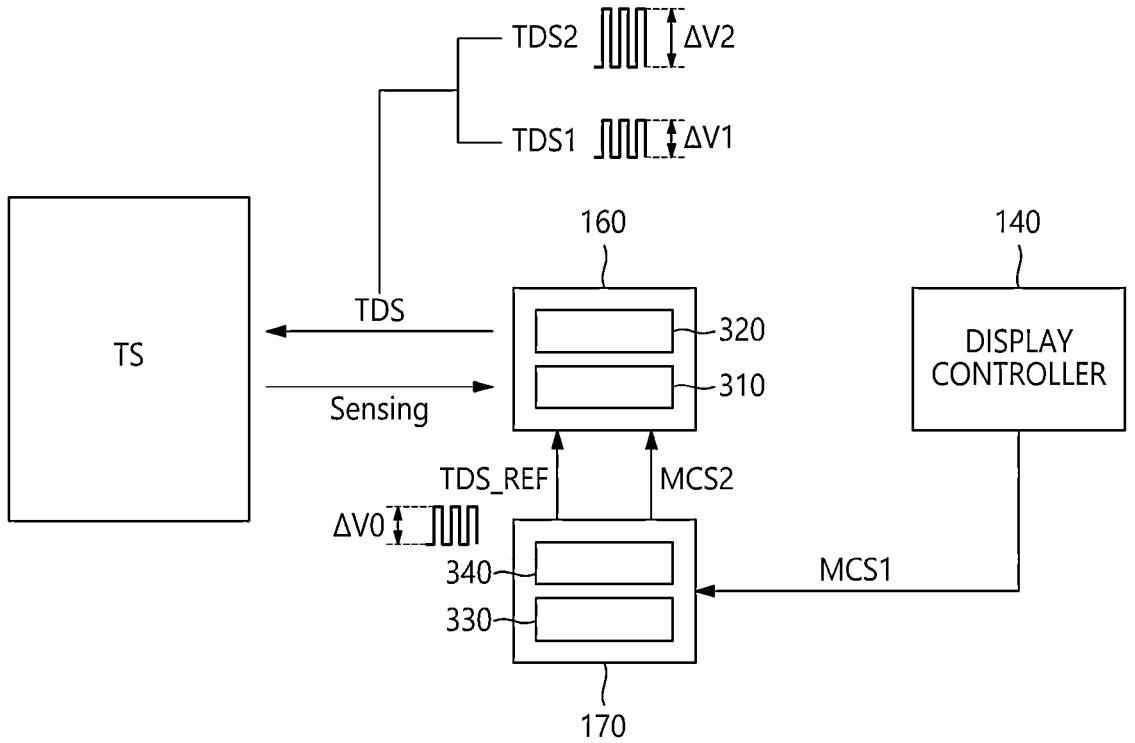
FIG. 3 illustrates a touch sensing system of a touch display device according to embodiments of the present disclosure.

FIG. 3 illustrates a touch sensing system of a touch display device 100 according to embodiments of the present disclosure.

Referring to FIG. 3, the touch display device 100 according to embodiments of the present disclosure can include a touch sensor TS, a touch driving circuit 160, a touch controller 170, and a display controller 140.

The touch driving circuit 160 can drive the touch sensor TS by supplying a touch driving signal TDS to the touch sensor TS, and can sense the touch sensor TS. The sensing the touch sensor TS by the touch driving circuit 160 can mean sensing a capacitance between the touch electrodes TE or sensing a capacitance of the touch electrodes TE. For example, the sensing the touch sensor TS by the touch driving circuit 160 may mean sensing a mutual-capacitance between the touch electrodes TE or sensing or a self-capacitance of the touch electrodes TE.

The touch controller 170 can supply a reference touch driving signal TDS_REF to the touch driving circuit 160. The reference touch driving signal TDS_REF can be a signal whose voltage level changes or fluctuates. The reference touch driving signal TDS_REF can be a signal having a reference amplitude $\Delta V0$. For example, the reference touch driving signal TDS_REF can be a square wave, a sine wave, a triangle wave, etc. For example, the reference touch driving signal TDS_REF can be a pulse width modulation (PWM) signal.

The touch driving circuit 160 can generate a touch driving signal TDS to be supplied to the touch sensor TS using the reference touch driving signal TDS_REF.

The touch driving signal TDS can be one of a first touch driving signal TDS1 applied to the touch sensor TS during a first period (e.g., a first touch sensing mode period) and a second touch driving signal TDS2 applied to the touch sensor TS during a second period (e.g., a second touch sensing mode period).

The first touch driving signal TDS1 and the second touch driving signal TDS2 can be signals having a variable voltage level. The first touch driving signal TDS1 can be a signal having a first amplitude $\Delta V1$, and the second touch driving signal TDS2 can be a signal having a second amplitude $\Delta V2$. For example, the first touch driving signal TDS1 and the second touch driving signal TDS2 can be a square wave, a sine wave, a triangle wave, or the like. For example, the first touch driving signal TDS1 and the second touch driving signal TDS2 can be pulse width modulation (PWM) signals. The frequency of the first touch driving signal TDS1 and the second touch driving signal TDS2 can be the same as the frequency of the reference touch driving signal TDS_REF.

The touch controller 170 can control the touch driving circuit 160. Specifically, the touch controller 170 can generate a second mode control signal MCS2 based on a first mode control signal MCS1 received from the display controller 140 and supply the second mode control signal MCS2 to the touch driving circuit 160, thereby controlling the operation timing of the touch driving circuit 160. Here, the second mode control signal MCS2 can also be referred to as a "touch mode control signal."

The operation timing and operation type of the touch driving circuit 160 according to the embodiments of the present disclosure can be defined by a combination of the first mode control signal MCS1 and the second mode control signal MCS2. In addition, the operation timing and operation type of the touch display device 100 according to the embodiments of the present disclosure can be defined by a combination of the first mode control signal MCS1 and the second mode control signal MCS2.

Hereinafter, it will be described again the touch driving circuit 160 and the touch controller 170 according to the embodiments of the present disclosure.

The touch driving circuit 160 according to the embodiments of the present disclosure can include a first signal input unit 310 configured to receive a reference touch driving signal, and a first signal output unit 320 configured to output a first touch driving signal TDS1 having a first amplitude $\Delta V1$ or a second touch driving signal TDS2 having a second amplitude $\Delta V2$ different from the first amplitude $\Delta V1$ to the touch sensor TS based on the reference touch driving signal TDS_REF and the second mode control signal MCS2.

The first signal output unit 320 can output the first touch driving signal TDS1 to N touch electrodes TE when the second mode control signal MCS2 has a first level voltage. The N is a natural number greater than or equal to 1.

The first signal output unit 320 can output the second touch driving signal TDS2 to M touch electrodes TE when the second mode control signal MCS2 has a second level voltage. Here, the M can be a value greater than N.

In this case, the second mode control signal MCS2 can have a first level voltage or a second level voltage. If the second mode control signal MCS2 has a first level voltage, the first touch driving signal TDS1 can be applied to N touch electrodes TE at one point in time. If the second mode control signal MCS2 has a second level voltage, the second touch driving signal TDS2 can be applied to M touch electrodes TE greater than N at one point in time.

The touch controller 170 according to the embodiments of the present disclosure can be a control device for controlling a touch sensing operation of a touch display device 100, and can include a second signal input unit 330 and a second signal output unit 340.

The second signal input unit 330 can be configured to receive a first mode control signal MCS1 from the display controller 140.

The second signal output unit 340 can be configured to output a reference touch driving signal TDS_REF, and can be configured to output a second mode control signal MCS2 generated based on the first mode control signal MCS1.

The first mode control signal MCS1 can include a first signal section having a first level voltage and a second signal section having a second level voltage different from the first level voltage. When the first mode control signal MCS1 is a first signal section having a first level voltage and a second signal section having a second level voltage, respectively, the second mode control signal MCS2 can be configured to have different signal section.

If the first mode control signal MCS1 is a second signal section having a second level voltage, the second mode control signal MCS2 can have a third level voltage.

If the first mode control signal MCS1 is a first signal section having a first level voltage, the second mode control signal MCS2 can include a signal section having a third level voltage and a signal section having a fourth level voltage different from the third level voltage.

Figure 4:
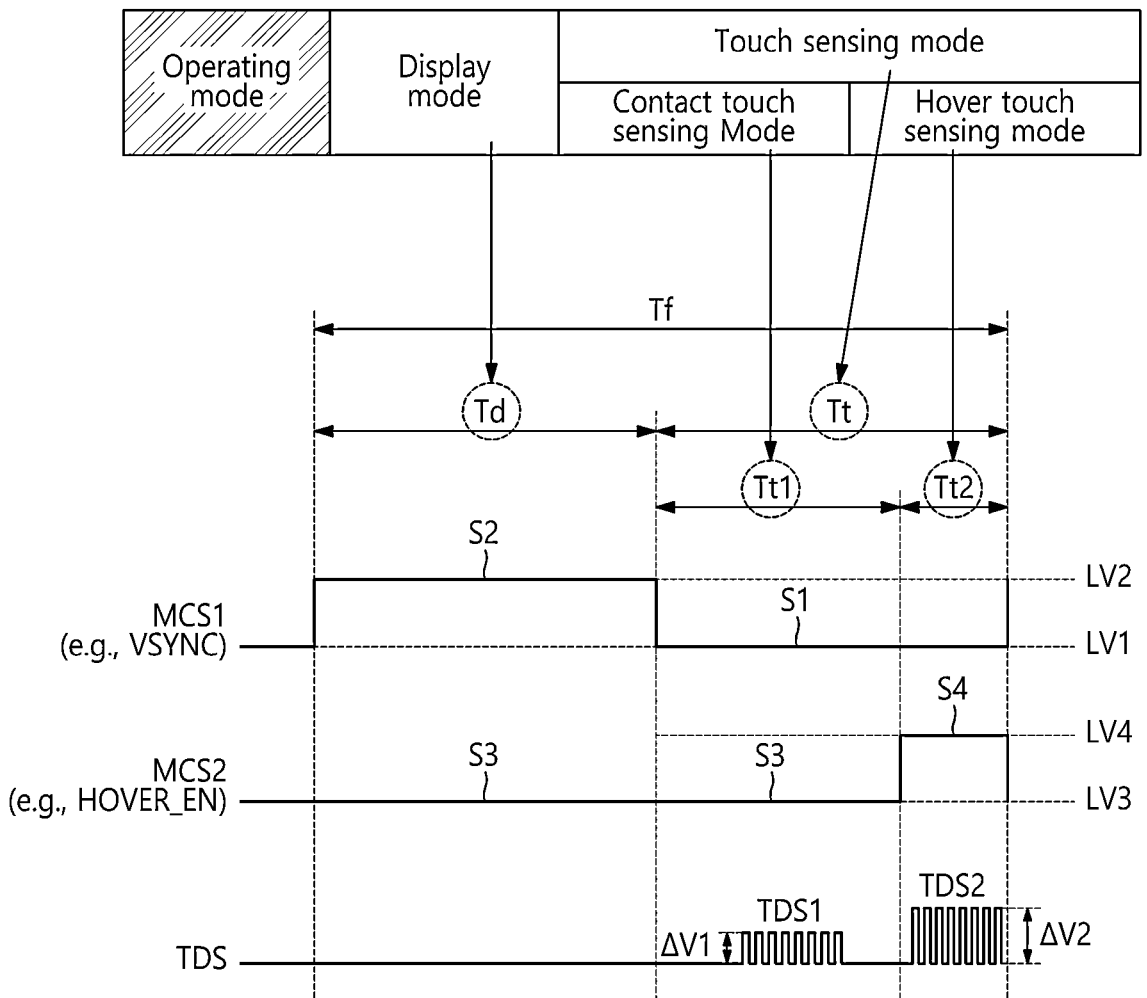
FIG. 4 illustrates a driving timing diagram of a touch display device according to embodiments of the present disclosure.

FIG. 4 illustrates a driving timing diagram of a touch display device 100 according to embodiments of the present disclosure, and FIG. 5 illustrates an operating mode definition table of a touch display device 100 according to embodiments of the present disclosure.

Referring to FIGS. 4 and 5, the touch display device 100 according to embodiments of the present disclosure can have a plurality of operating modes. The plurality of operating modes can include a display mode for displaying an image and a touch sensing mode for sensing a touch.

The touch sensing mode can include a first touch sensing mode and a second touch sensing mode. The first touch sensing mode can be a contact touch sensing mode for sensing a contact touch, which is a touch that contacts a screen, and the second touch sensing mode can be a hover touch sensing mode for sensing a hover touch, which is a touch which is within a predetermined distance from the screen without contacting the screen.

In the embodiments of the present disclosure, the hover touch can also be referred to as a non-contact touch. In the embodiments of the present disclosure, the hover touch can mean an action in which the user's body or pen indicates to a specific point on the screen without the user contacting the screen, or can mean a gesture such as a hand gesture or movement in which the user's body or pen moves on or over the screen. For example, the hover touch can mean a gesture such as a hand gesture or movement in which the user's body or pen moves on or over the screen, without the user contacting the screen.

In the embodiments of the present disclosure, the sensing a hover touch can mean detecting a position of a body or pen which is not in contact with the screen (i.e., non-contact state), or detecting an operation of a body or pen which is not in contact with the screen (i.e., non-contact state).

An operation period of the touch display device 100 can include a display mode period Td and a touch sensing mode period Tt, and the touch sensing mode period Tt can include a first touch sensing mode period Tt1 and a second touch sensing mode period Tt2.

The display mode period Td can be a period during which the touch display device 100 operates in a display mode, and the touch sensing mode period Tt can be a period during which the touch display device 100 operates in a touch sensing mode.

The first touch sensing mode period Tt1 can be a period during which the touch display device 100 operates in the first touch sensing mode (e.g., a contact touch sensing mode), and the second touch sensing mode period Tt2 can be a period during which the touch display device 100 operates in the second touch sensing mode (e.g., a hover touch sensing mode). However, the present disclosure is not limited thereto. For example, the first touch sensing mode period Tt1 may be a period during which the touch display device 100 operates in the first touch sensing mode (e.g., a hover touch sensing mode), and the second touch sensing mode period Tt2 may be a period during which the touch display device 100 operates in the second touch sensing mode (e.g., a contact touch sensing mode).

During the touch sensing mode period Tt, the touch driving circuit 160 can supply a touch driving signal TDS to the touch sensor TS.

During the first touch sensing mode period Tt1, the touch driving circuit 160 can supply a first touch driving signal TDS1 to the touch sensor TS. Here, the first touch driving signal TDS1 can be a signal whose voltage level changes over time, and can have a first frequency and a first amplitude ΔV1.

During the second touch sensing mode period Tt2, the touch driving circuit 160 can supply a second touch driving signal TDS2 to the touch sensor TS. Here, the second touch driving signal TDS2 can be a signal whose voltage level changes over time, and can have a second frequency and a second amplitude ΔV2. The second frequency can be the same as or different from the first frequency. The second amplitude ΔV2 can be different from the first amplitude ΔV1.

The operation period of the touch display device (100) can also be referred to as an operation period of the display panel 110.

Referring to FIG. 4, since the second touch sensing mode period Tt2 is a hover touch sensing mode period, the second amplitude ΔV2 of the second touch driving signal TDS2 can be greater than the first amplitude ΔV1 of the first touch driving signal TDS1 in order to improve hover touch sensing performance. For example, the second frequency of the second touch driving signal TDS2 may be the same as the first frequency of the first touch driving signal TDS1, and the second amplitude ΔV2 of the second touch driving signal TDS2 may be greater than the first amplitude ΔV1 of the first touch driving signal TDS1. Alternatively, the second frequency of the second touch driving signal TDS2 may be different from the first frequency of the first touch driving signal TDS1, and the second amplitude ΔV2 of the second touch driving signal TDS2 may be greater than the first amplitude ΔV1 of the first touch driving signal TDS1. However, the present disclosure is not limited thereto.

During the first touch sensing mode period Tt1, the first touch driving signal TDS1 can be applied to a plurality of first touch electrodes TE1. For example, during the first touch sensing mode period Tt1, the first touch driving signal TDS1 can be sequentially applied to each of the plurality of first touch electrodes TE1.

During the second touch sensing mode period Tt2, two or more first touch electrodes TE1 among the plurality of first touch electrodes TE1 can be electrically connected to operate as one large first touch electrode TE1. In addition, during the second touch sensing mode period Tt2, two or more second touch electrodes TE2 among the plurality of second touch electrodes TE2 can be electrically connected to operate as one large second touch electrode TE2.

During the second touch sensing mode period Tt2, the second touch driving signal TDS2 can be simultaneously applied to two or more first touch electrodes TE1 which are electrically connected to each other among the plurality of first touch electrodes TE1, or the second touch driving signal TDS2 can be simultaneously applied to two or more second touch electrodes TE2 that are electrically connected to each other among the plurality of second touch electrodes TE2.

As described above, the touch display device 100 according to the embodiments of the present disclosure can further include a display driving circuit for driving a plurality of subpixels SP, a display controller 140 for controlling the display driving circuit and supplying a first mode control signal MCS1 to the touch controller 170, and a touch controller 170 for supplying a second mode control signal MCS2 to the touch driving circuit 160. Here, the display driving circuit can include a data driving circuit 120, a gate driving circuit 130, and the like.

Referring to FIG. 4 and FIG. 5, the display mode period Td, the first touch sensing mode period Tt1, and the second touch sensing mode period Tt2 can be distinguished or defined by the first mode control signal MCS1 and the second mode control signal MCS2.

The first mode control signal MCS1 can be a control signal for distinguishing the display mode period Td and the touch sensing mode period Tt, and the second mode control signal MCS2 can be a control signal for distinguishing the first touch sensing mode period Tt1 and the second touch sensing mode period Tt2.

Referring to FIG. 4, for example, the first mode control signal MCS1 can be a vertical synchronization signal VSYNC for dividing one display frame period into an active period and a blank period. In the vertical synchronization signal VSYNC, the active period can be the display mode period Td, and the blank period can be the touch sensing mode period Tt.

The vertical synchronization signal VSYNC can be one of the display driving control signals DDCS provided from the host system 180 to the display controller 140.

The display controller 140 can provide the vertical synchronization signal VSYNC received from the host system 180 to the touch controller 170 as the first mode control signal MCS1.

For example, the second mode control signal MCS2 can be a hover enable signal HOVER_EN for enabling the hover touch sensing mode, which is the second touch sensing mode.

The first mode control signal MCS1 can include a first signal section S1 having a first level voltage LV1 and a second signal section S2 having a second level voltage LV2 different from the first level voltage LV1.

The second mode control signal MCS2 can include a third signal section S3 having a third level voltage LV3 and a fourth signal section S4 having a fourth level voltage LV4 different from the third level voltage LV3.

During the display mode period Td, the first mode control signal MCS1 can have a second level voltage LV2, and the second mode control signal MCS2 can have a third level voltage LV3.

During the first touch sensing mode period Tt1, the first mode control signal MCS1 can have a first level voltage LV1, and the second mode control signal MCS2 can have a third level voltage LV3.

During the second touch sensing mode period Tt2, the first mode control signal MCS1 can have a first level voltage LV1, and the second mode control signal MCS2 can have a fourth level voltage LV4.

A touch display device 100 according to embodiments of the present disclosure can include a display panel 110 including a plurality of subpixels SP and a plurality of touch electrodes TE, a display driving circuit which drives the plurality of subpixels SP, a touch driving circuit 160 which supplies a touch driving signal to at least one of the plurality of touch electrodes TE, a display controller 140 which controls the display driving circuit and supplies a first mode control signal MCS1 to the touch controller 170, and a touch controller (170) which supplies a second mode control signal MCS2 to the touch driving circuit 160.

Referring to FIGS. 4 and 5, the display mode period Td, the first touch sensing mode period Tt1, and the second touch sensing mode period Tt2 can be distinguished by the first mode control signal MCS1 and the second mode control signal MCS2.

Figure 6:
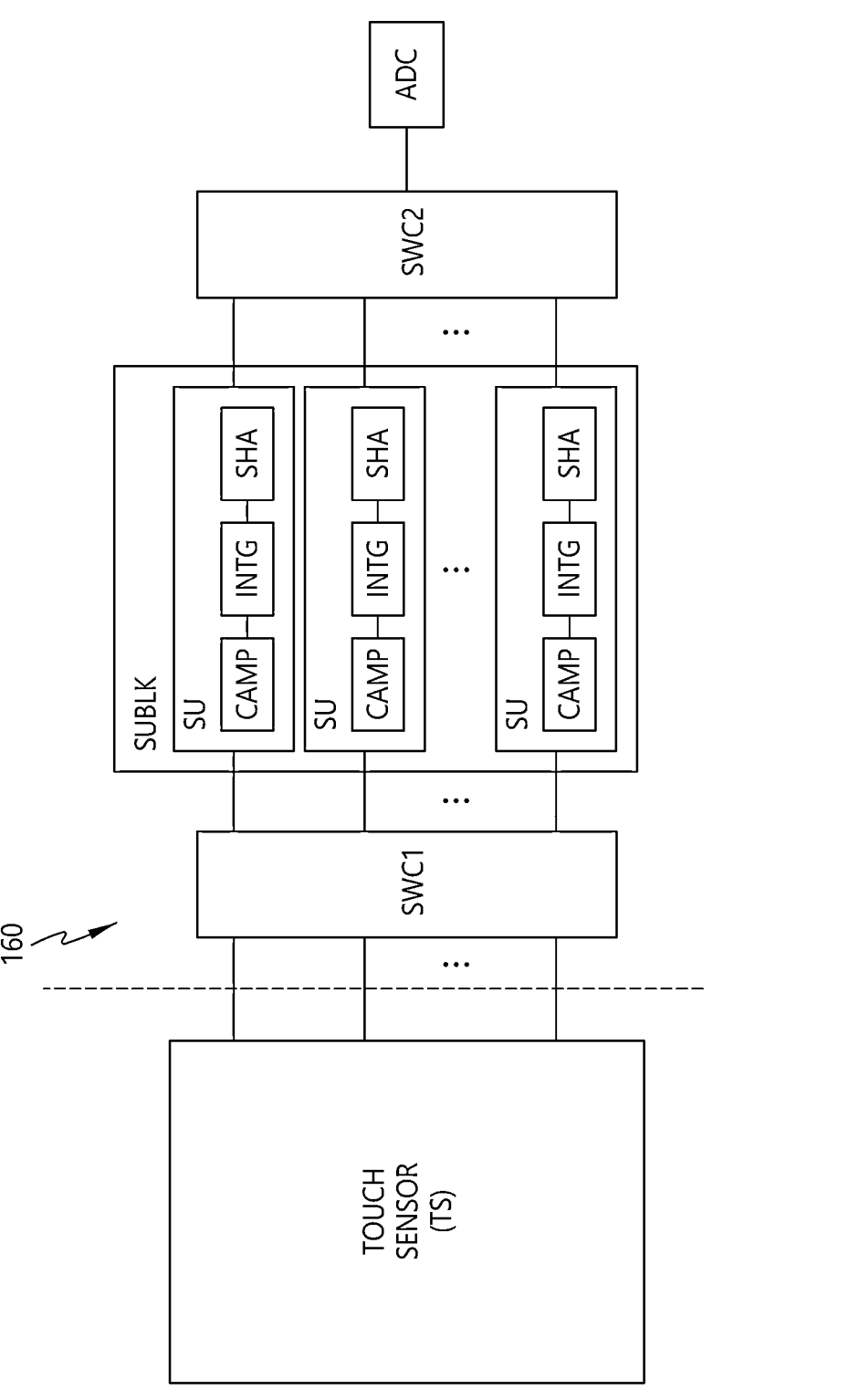
FIG. 6 illustrates a touch driving circuit according to embodiments of the present disclosure.
Figure 7:
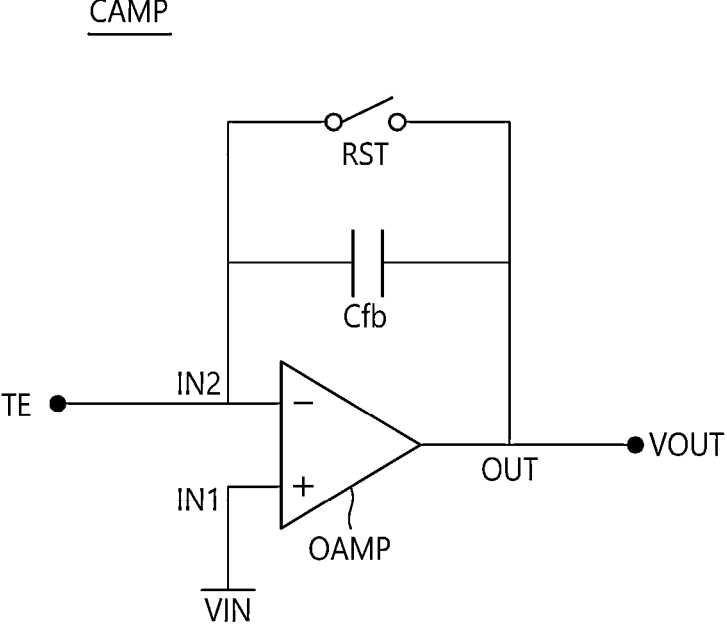
FIG. 7 illustrates a charge amplifier in a touch driving circuit according to embodiments of the present disclosure.

FIG. 6 illustrates a touch driving circuit 160 according to embodiments of the present disclosure, and FIG. 7 illustrates a charge amplifier CAMP in a touch driving circuit 160 according to embodiments of the present disclosure.

Referring to FIG. 6, the touch driving circuit 160 according to the embodiments of the present disclosure can include a sensing unit block SUBLK for sensing a touch sensor TS. The sensing unit block SUBLK can include a plurality of sensing units SU.

The touch driving circuit 160 according to the embodiments of the present disclosure can further include a first switch circuit SWC1, a second switch circuit SWC2, and an analog-to-digital converter ADC.

The first switch circuit SWC1 can connect the touch electrodes TE to be sensed among the plurality of touch electrodes TE included in the touch sensor TS to the sensing unit block SUBLK. The first switch circuit SWC1 can include a plurality of switches, and can also be referred to as a multiplexer circuit.

The second switch circuit SWC2 can connect one of the plurality of sensing units SU included in the sensing unit block SUBLK to the analog-to-digital converter ADC. The second switch circuit SWC2 can include a plurality of switches, and can also be referred to as a multiplexer circuit.

Each of the plurality of sensing units SU can include a charge amplifier CAMP, an integrator INTG, and a sample and hold circuit SHA.

The charge amplifier CAMP can be electrically connected to one or more touch electrodes TE selected by the first switch circuit SWC1 among the plurality of touch electrodes TE included in the touch sensor TS. For example, the charge amplifier CAMP may be electrically connected to one or more touch electrodes TE among the plurality of touch electrodes TE included in the touch sensor TS through the first switch circuit SWC1.

The charge amplifier CAMP can receive a touch sensing signal from one or more touch electrodes TE selected as a sensing target among a plurality of connectable touch electrodes TE.

The first switch circuit SWC1 can connect a touch electrode TE as the sensing target among a plurality of connectable touch electrodes TE to the charge amplifier CAMP in a corresponding sensing unit SU among a plurality of sensing units SU. However, the present disclosure is not limited thereto.

Accordingly, the charge amplifier CAMP in the corresponding sensing unit SU can receive a touch sensing signal from the touch electrode TE which is a sensing target. For example, the charge amplifier CAMP in the corresponding sensing unit SU can detect a touch sensing signal from the touch electrode as the sensing target. Here, the touch sensing signal detected at the touch electrode TE can correspond to the capacitance (e.g., mutual-capacitance or self-capacitance) associated with the touch electrode TE.

Referring to FIGS. 6 and 7, the charge amplifier CAMP can output an output signal VOUT corresponding to the touch sensing signal detected at the touch electrode TE.

Referring to FIG. 7, the charge amplifier CAMP can include an operational amplifier OP-AMP including a first input node IN1, a second input node IN2, an output node OUT, and a feedback capacitor Cfb between the second input node IN2 and the output node OUT.

The first input node IN1 can be a node to which an input signal VIN is input. The second input node IN2 can be a node electrically connected to the touch electrode TE selected by the first switch circuit SWC1. The output node OUT can be a node connected to the integrator INTG, and can be a node outputting an output signal VOUT.

A charge corresponding to the capacitance (e.g., self-capacitance or mutual capacitance) in the touch electrode TE can be charged in the feedback capacitor Cfb, and an output signal VOUT corresponding to the amount of charge charged in the feedback capacitor Cfb can be output. Here, the touch driving circuit 160 detecting a touch sensing signal from the touch electrode TE can mean that the touch driving circuit 160 detects the capacitance (e.g., self-capacitance or mutual-capacitance) of the touch electrode TE, or can mean that the touch driving circuit 160 charges the amount of charge corresponding to the capacitance (e.g., self-capacitance or mutual-capacitance) of the touch electrode TE in the feedback capacitor Cfb, and outputs the output signal VOUT corresponding to the amount of charge charged.

The charge amplifier CAMP can further include a reset switch RST which controls a connection between the second input node IN2 and the output node OUT. For example, the reset switch RST may be disposed between the second input node IN2 and the output node OUT.

Referring to FIG. 6, the integrator INTG can output an integral value integrating the output signal VOUT of the charge amplifier CAMP. Here, the charge amplifier CAMP and the integrator INTG can be implemented in an integrated manner.

The sample and hold circuit SHA can store the integral value output from the integrator INTG until the next integral value is output from the integrator INTG.

The second switch circuit SWC2 can connect one of the plurality of sensing units SU included in the sensing unit block SUBLK to the analog-to-digital converter ADC.

The analog-to-digital converter ADC can convert an integral value stored in the sample-and-hold circuit (SHA) in the sensing unit SU selected by the second switch circuit SWC2 into a digital value to generate touch sensing data.

The touch driving circuit 160 can transmit the touch sensing data generated by the analog-to-digital converter ADC to the touch controller 170. In this case, the touch sensing data can be transmitted in the form of a differential signal.

Meanwhile, referring to FIG. 7, an input signal (VIN) input to the first input node IN1 of the charge amplifier CAMP can be a signal whose voltage level does not change or a signal whose voltage level changes or swings.

The type of input signal VIN can vary depending on the sensing method.

More specifically, if touch sensing is performed in a mutual-sensing method, the input signal VIN can be a reference voltage whose voltage level does not change or vary. If touch sensing is performed in a self-sensing method, the input signal VIN can be a second touch driving signal TDS2 whose voltage level changes.

The type of the input signal (VIN) can vary depending on the type of the touch sensing mode.

More specifically, during the first touch sensing mode period Tt1, the input signal VIN can be a reference voltage whose voltage level does not change. During the second touch sensing mode period Tt2, the input signal VIN can be a second touch driving signal TDS2 whose voltage level changes.

Hereinafter, it will be described in more detail a circuit structure and operation during the first touch sensing mode period Tt1 and the second touch sensing mode period Tt2.

Figure 8:
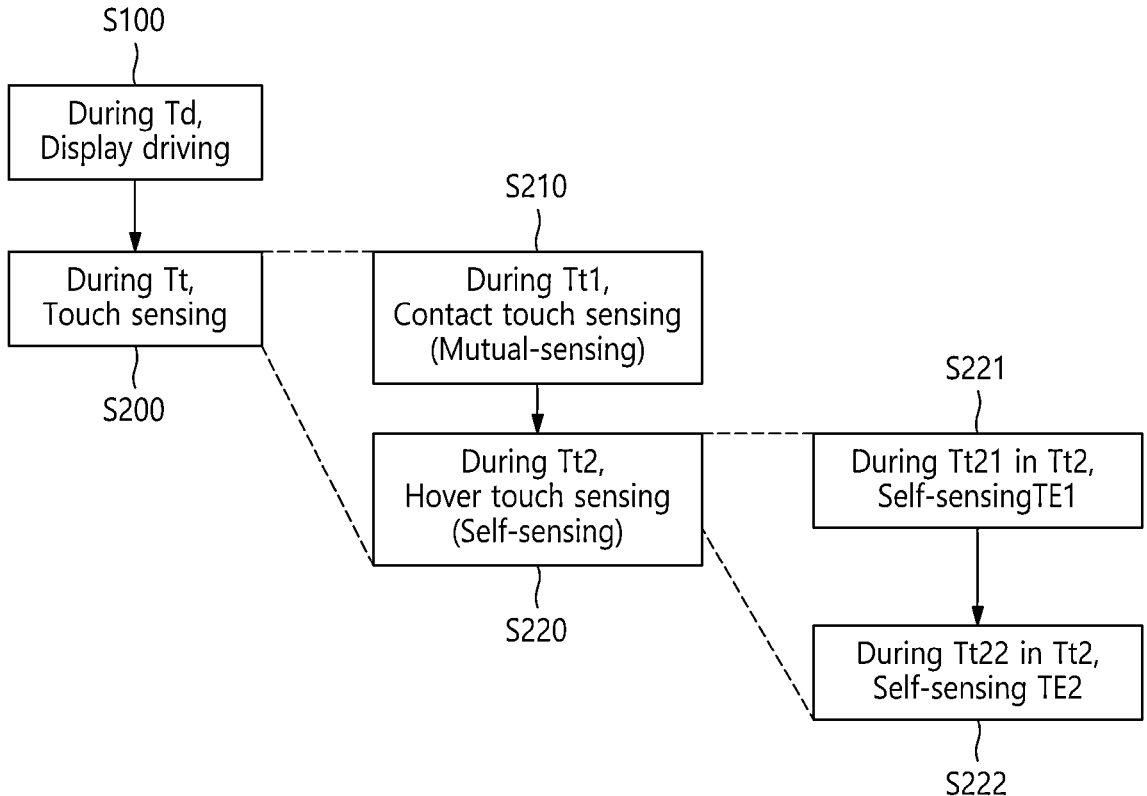
FIG. 8 is a flowchart of an operating method of a touch display device according to embodiments of the present disclosure.

FIG. 8 is a flowchart of an operating method of a touch display device according 100 to embodiments of the present disclosure.

Referring to FIG. 8, an operating method of the touch display device 100 according to the embodiments of the present disclosure can include a step S100 in which the display driving circuit performs display driving for displaying an image through the display panel 110 during a display mode period Td and a step S200 in which the touch sensing circuit 150 performs touch sensing during a touch sensing mode period Tt.

The touch sensing mode period Tt can include a first touch sensing mode period Tt1 and a second touch sensing mode period Tt2 which do not temporally overlap with each other.

During the first touch sensing mode period Tt1, there can be performed a contact touch sensing in a mutual-sensing manner. During the second touch sensing mode period Tt2, there can be performed a hover touch sensing (i.e., non-contact touch sensing) in a self-sensing manner.

The step S200 can include a step S210 in which the touch sensing circuit 150 senses a contact touch in a mutual-sensing manner during the first touch sensing mode period Tt1 and a step S220 in which the touch sensing circuit 150 senses a hover touch (i.e., non-contact touch) in a self-sensing manner during the second touch sensing mode period Tt2.

The second touch sensing mode period Tt2 can include a first sub-sensing period Tt21 and a second sub-sensing period Tt22 which do not overlap with each other. The first sub-sensing period Tt21 can be a period for sensing a plurality of first touch electrodes TE1 in a self-sensing manner, and the second sub-sensing period Tt22 can be a period for sensing a plurality of second touch electrodes TE2 in a self-sensing manner.

The step S220 can include a step S221 in which the touch sensing circuit 150 senses a plurality of first touch electrodes TE1 in a self-sensing manner during a first sub-sensing period Tt21, and a step S222 in which the touch sensing circuit 150 senses a plurality of second touch electrodes TE2 in a self-sensing manner during a second sub-sensing period Tt22.

In step S221, during the first sub-sensing period Tt21, a second touch driving signal TDS2 can be simultaneously applied to two or more first touch electrodes TE1 which are electrically connected to each other among the plurality of first touch electrodes TE1.

In step S222, during the second sub-sensing period Tt22, a second touch driving signal TDS2 can be simultaneously applied to two or more second touch electrodes TE2 that are electrically connected to each other among a plurality of second touch electrodes TE2.

Figure 9A:
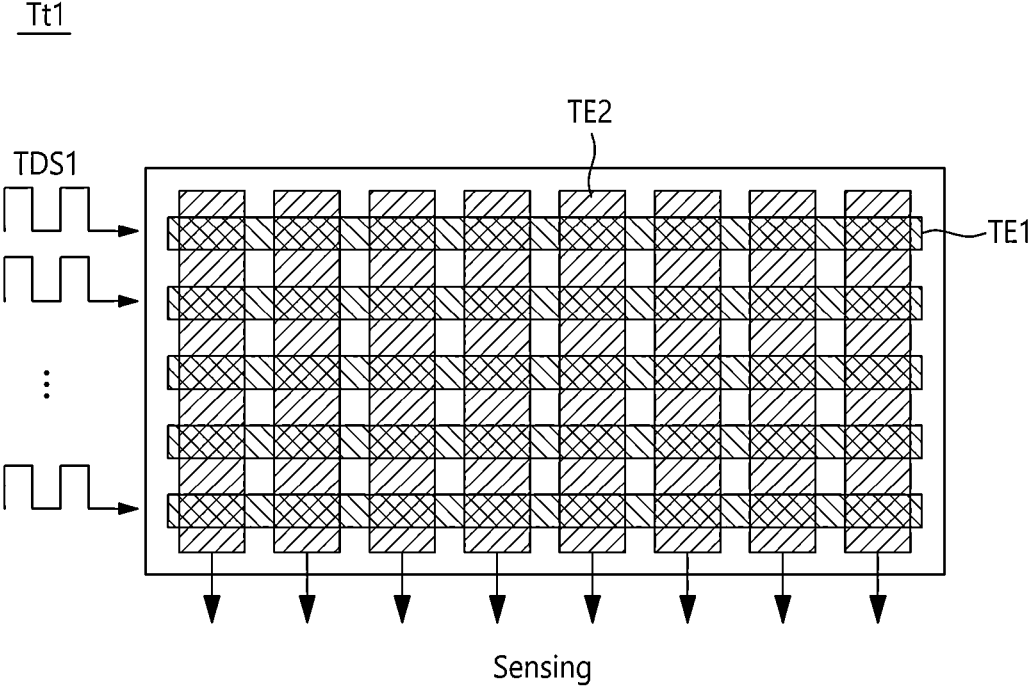
FIG. 9A and FIG. 9B are diagrams illustrating a driving situation when an operation period of a touch display device according to embodiments of the present disclosure is a first touch sensing mode period.
Figure 9B:
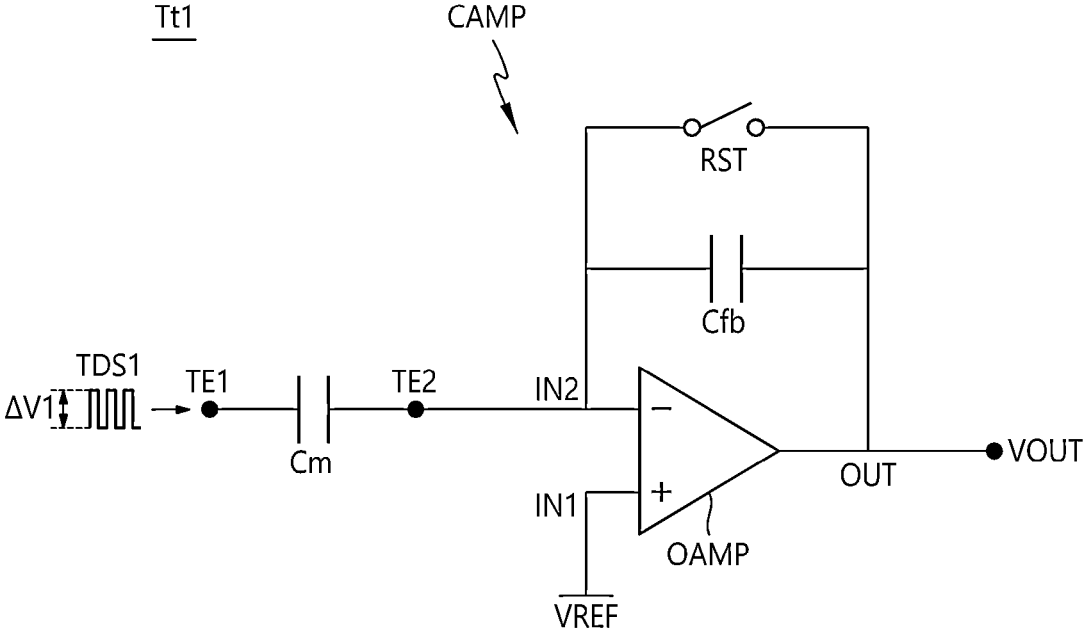

FIG. 9A and FIG. 9B are diagrams illustrating a driving situation when an operation period of a touch display device 100 according to embodiments of the present disclosure is a first touch sensing mode period Tt1.

Referring to FIGS. 9A and 9B, during the first touch sensing mode period Tt1, there can be performed an operation for sensing a contact touch in a mutual-sensing manner.

During the first touch sensing mode period Tt1, the touch driving circuit 160 can apply a first touch driving signal TDS1 having a first amplitude $\Delta V1$ to at least one of the plurality of first touch electrodes TE1.

For example, during the first touch sensing mode period Tt1, the first touch driving signal TDS1 can be sequentially applied to the plurality of first touch electrodes TE1. For example, at any point in time during the first touch sensing mode period Tt1, the first touch driving signal TDS1 can be applied to one first touch electrode TE1.

For another example, during the first touch sensing mode period Tt1, a plurality of first touch electrodes TE1 can be grouped into a plurality of first touch electrode groups. Each of the plurality of first touch electrode groups can include two or more first touch electrodes TE1. During the first touch sensing mode period Tt1, the first touch driving signal TDS1 can be sequentially applied to the plurality of first touch electrode groups. For example, at any point in time during the first touch sensing mode period Tt1, the first touch driving signal TDS1 can be simultaneously applied to two or more first touch electrodes TE1 included in one first touch electrode group. Accordingly, if the first touch driving signal TDS1 is simultaneously applied to two or more first touch electrodes TE1 included in one first touch electrode group during the first touch sensing mode period Tt1, a first touch driving signal TDS1 applied to at least one first touch electrode TE1 among the two or more first touch electrodes TE1 and a first touch driving signal TDS1 applied to the remaining first touch electrodes TE1 can have a phase difference. For example, during the first touch sensing mode period Tt1, a first touch driving signal TDS1 applied to at least one of the two or more first touch electrodes TE1 and a first touch driving signal TDS1 applied to the remaining first touch electrodes TE1 can have an antiphase relationship (i.e., 180 degree phase difference). However, the present disclosure is not limited thereto.

During the first touch sensing mode period Tt1, a reference voltage VREF in the form of a direct current (DC) voltage whose voltage level does not change can be input to a first input node IN1 of the charge amplifier CAMP in the touch driving circuit 160.

During the first touch sensing mode period Tt1, a second input node IN2 of the charge amplifier CAMP in the touch driving circuit 160 can be electrically connected to at least one second touch electrode TE2 among the plurality of second touch electrodes TE2.

During the first touch sensing mode period Tt1, a mutual capacitance Cm can be formed between the first touch electrode TE1 and the second touch electrode TE2. Referring to FIG. 9B, the feedback capacitor Cfb may be disposed between the second input node IN2 and the output node OUT of the charge amplifier CAMP, and a charge corresponding to the mutual capacitance Cm between the first touch electrode TE1 and the second touch electrode TE2 can be charged in a feedback capacitor Cfb of a charge amplifier CAMP. An output voltage VOUT corresponding to the amount of charge charged in the feedback capacitor Cfb can be output to an output node OUT of the charge amplifier CAMP.

Figure 10A:
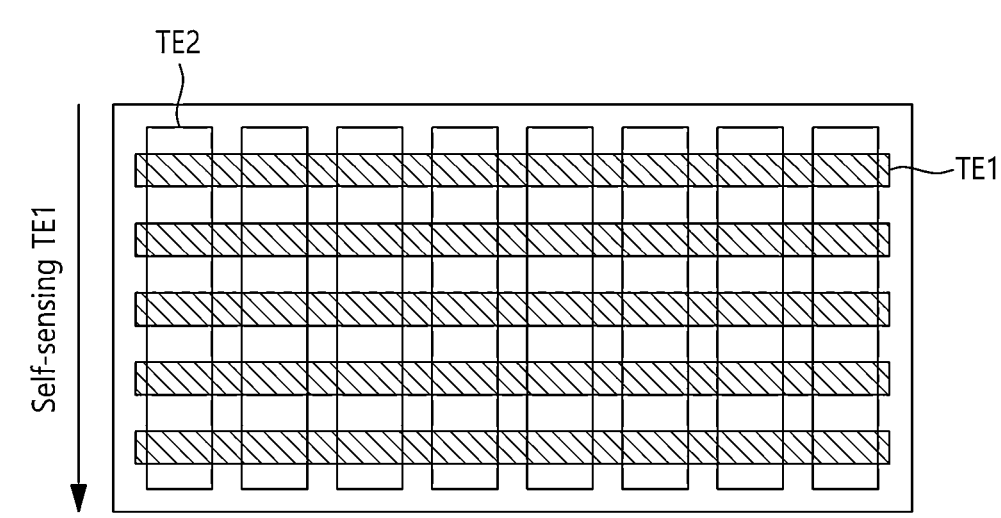
FIG. 10A and FIG. 10B are diagrams illustrating a driving situation when an operation period of a touch display device according to embodiments of the present disclosure is a first sub-sensing period within a second touch sensing mode period.
Figure 10B:
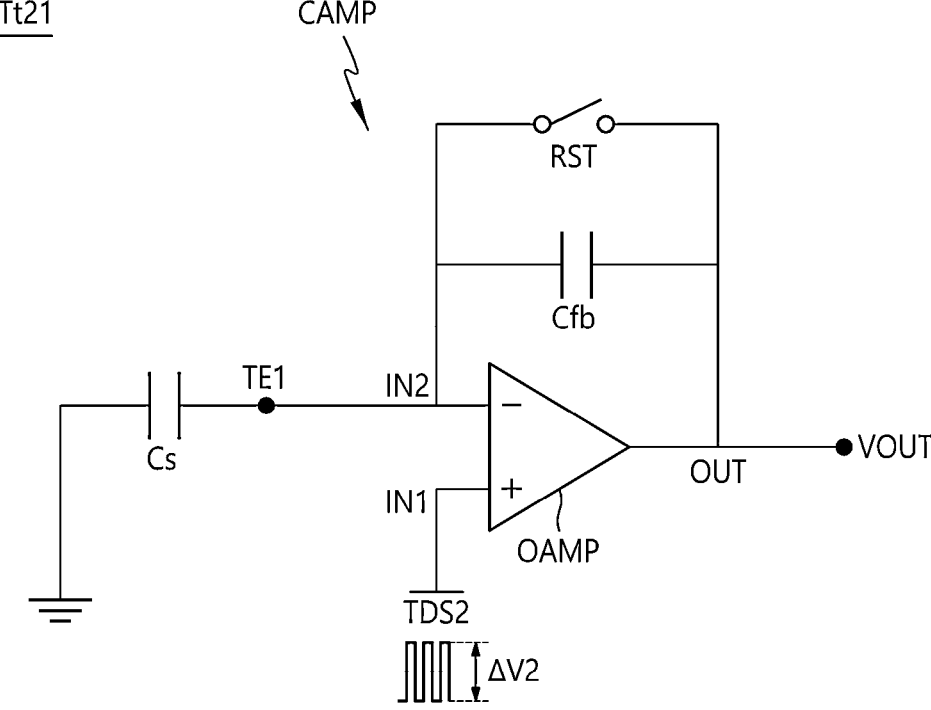

FIG. 10A and FIG. 10B are diagrams illustrating a driving situation when an operation period of a touch display device 100 according to embodiments of the present disclosure is a first sub-sensing period Tt21 within a second touch sensing mode period Tt2.

Figure 11A:
FIGS. 11A and 11B are diagrams illustrating driving situation when an operation period of a touch display device according to embodiments of the present disclosure is a second sub-sensing period within the second touch sensing mode period.
Figure 11B:
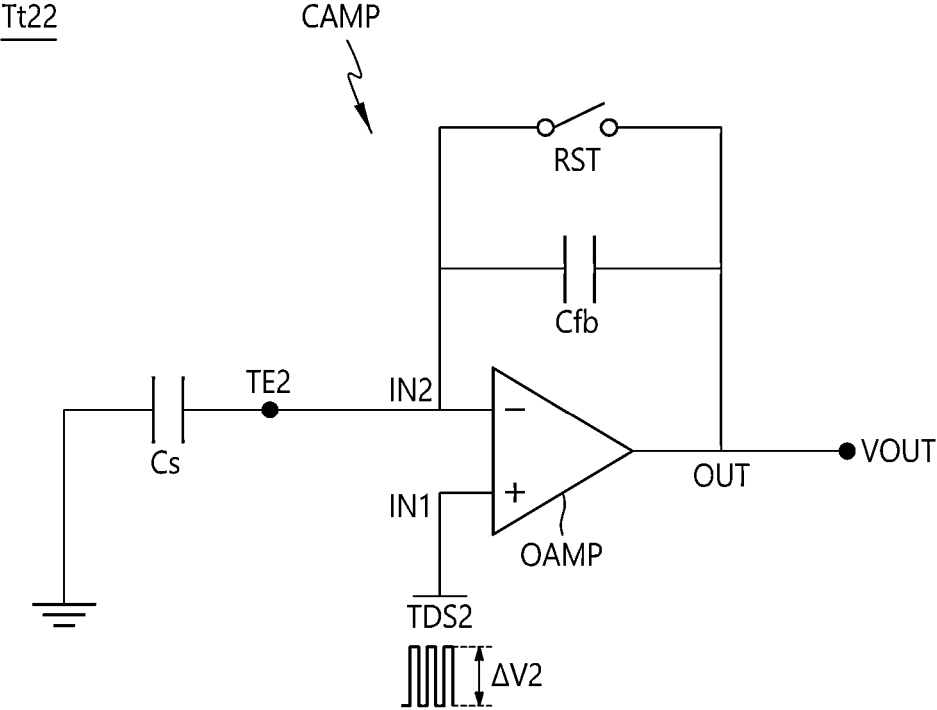

FIGS. 11A and 11B are diagrams illustrating driving situation when an operation period of a touch display device 100 according to embodiments of the present disclosure is a second sub-sensing period Tt22 within the second touch sensing mode period Tt2.

Referring to FIGS. 10A, 10B, 11A and 11B, during the second touch sensing mode period Tt2, there can be performed an operation for sensing a hover touch in a self-sensing manner.

During the second touch sensing mode period Tt2, the first sub-sensing period Tt21 can be performed first, and then the second sub-sensing period Tt22 can be performed. Alternatively, during the second touch sensing mode period Tt2, the second sub-sensing period Tt22 can be performed first, and then the first sub-sensing period Tt21 can be performed.

Referring to FIGS. 10A and 10B, during the first sub-sensing period Tt21, the plurality of second touch electrodes TE2 can be in an electrically floating state. For example, during the first sub-sensing period Tt21, the plurality of second touch electrodes TE2 can be in a state where no electrical signal or voltage is applied.

During the first sub-sensing time Tt21, a second touch driving signal TDS2 having a variable voltage level can be input to the first input node IN1 of the charge amplifier CAMP in the touch driving circuit 160. The second touch driving signal TDS2 can have a second amplitude ΔV2 greater than the first amplitude ΔV1. For example, the second frequency of the second touch driving signal TDS2 may be the same as the first frequency of the first touch driving signal TDS1, and the second amplitude ΔV2 of the second touch driving signal TDS2 may be greater than the first amplitude ΔV1 of the first touch driving signal TDS1. Alternatively, the second frequency of the second touch driving signal TDS2 may be different from the first frequency of the first touch driving signal TDS1, and the second amplitude ΔV2 of the second touch driving signal TDS2 may be greater than the first amplitude ΔV1 of the first touch driving signal TDS1. However, the present disclosure is not limited thereto.

During the first sub-sensing time Tt21, a second input node IN2 of the charge amplifier CAMP in the touch driving circuit 160 can be electrically connected to at least one first touch electrode TE1 among the plurality of first touch electrodes TE1.

Accordingly, a second touch driving signal TDS2 input to the first input node IN1 of the charge amplifier CAMP can be applied to at least one first touch electrode TE1 connected to the second input node IN2 of the charge amplifier CAMP.

During the first sub-sensing time Tt21, a self-capacitance Cs can be formed in the first touch electrode TE1. A charge corresponding to the self-capacitance Cs formed on the first touch electrode TE1 can be charged to a feedback capacitor (Cfb) of a charge amplifier CAMP. An output voltage VOUT corresponding to the amount of charge charged to the feedback capacitor Cfb can be output to an output node OUT of the charge amplifier CAMP.

Referring to FIGS. 11A and 11B, during the second sub-sensing period Tt22, a plurality of first touch electrodes TE1 can be in an electrically floating state. For example, during the second sub-sensing period Tt22, the plurality of first touch electrodes TE1 can be in a state where no electrical signal or voltage is applied.

During the second sub-sensing period Tt22, a second touch driving signal TDS2 can be input to the first input node IN1 of the charge amplifier CAMP in the touch driving circuit 160.

During the second sub-sensing period Tt22, the second input node IN2 of the charge amplifier CAMP in the touch driving circuit 160 can be electrically connected to at least one second touch electrode TE2 among the plurality of second touch electrodes TE2. For example, during the second sub-sensing period Tt22, the second input node IN2 of the charge amplifier CAMP in the touch driving circuit 160 may be electrically connected to two or more second touch electrodes TE2 among the plurality of second touch electrodes TE2.

Accordingly, the second touch driving signal TDS2 input to the first input node IN1 of the charge amplifier CAMP can be applied to at least one second touch electrode TE2 connected to the second input node IN2 of the charge amplifier CAMP.

During the second sub-sensing period Tt22, a self-capacitance Cs can be formed in the second touch electrode TE2. A charge corresponding to the self-capacitance Cs formed on the second touch electrode TE2 can be charged to the feedback capacitor Cfb of the charge amplifier CAMP. An output voltage VOUT corresponding to the amount of charge charged to the feedback capacitor Cfb can be output to the output node OUT of the charge amplifier CAMP.

Figure 12:
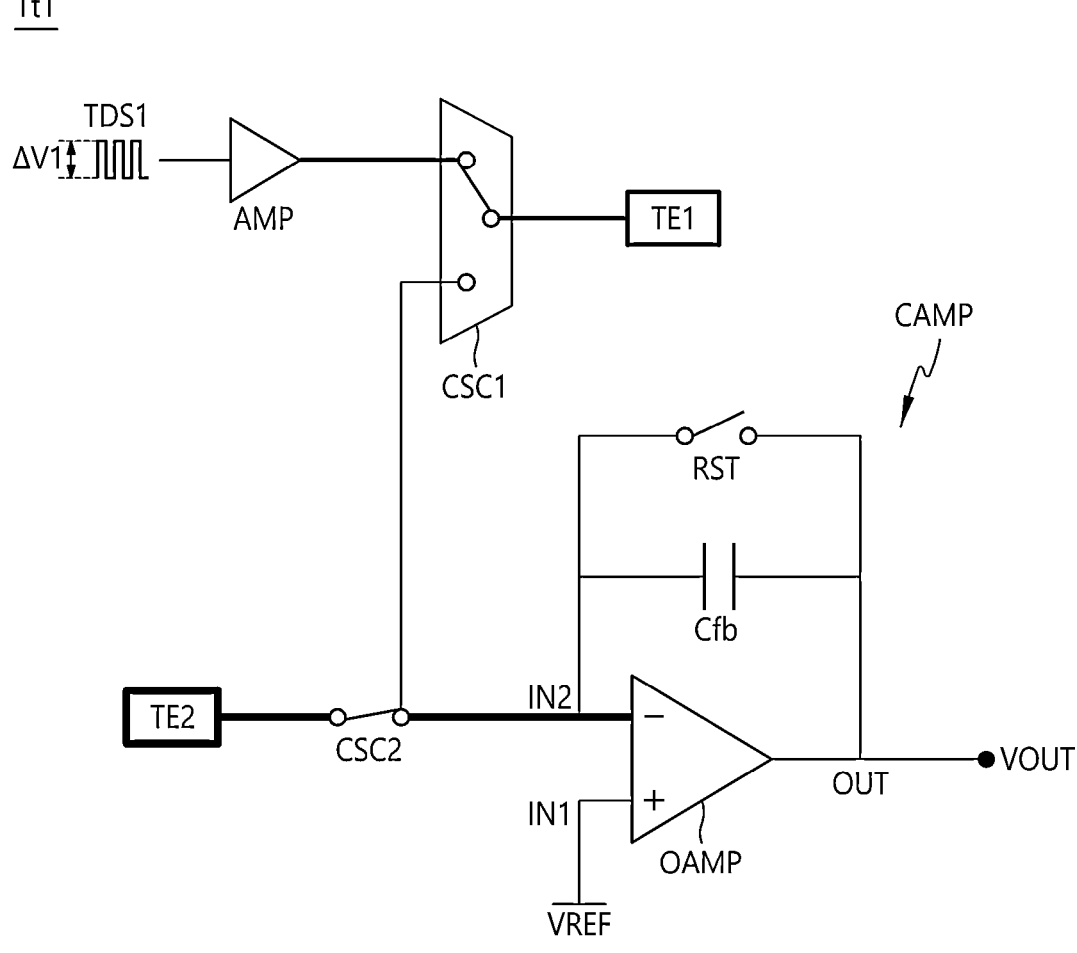
FIGS. 12, 13, and 14 are diagrams briefly illustrating the operation of a touch driving circuit during a touch sensing mode period according to embodiments of the present disclosure.
Figure 13:
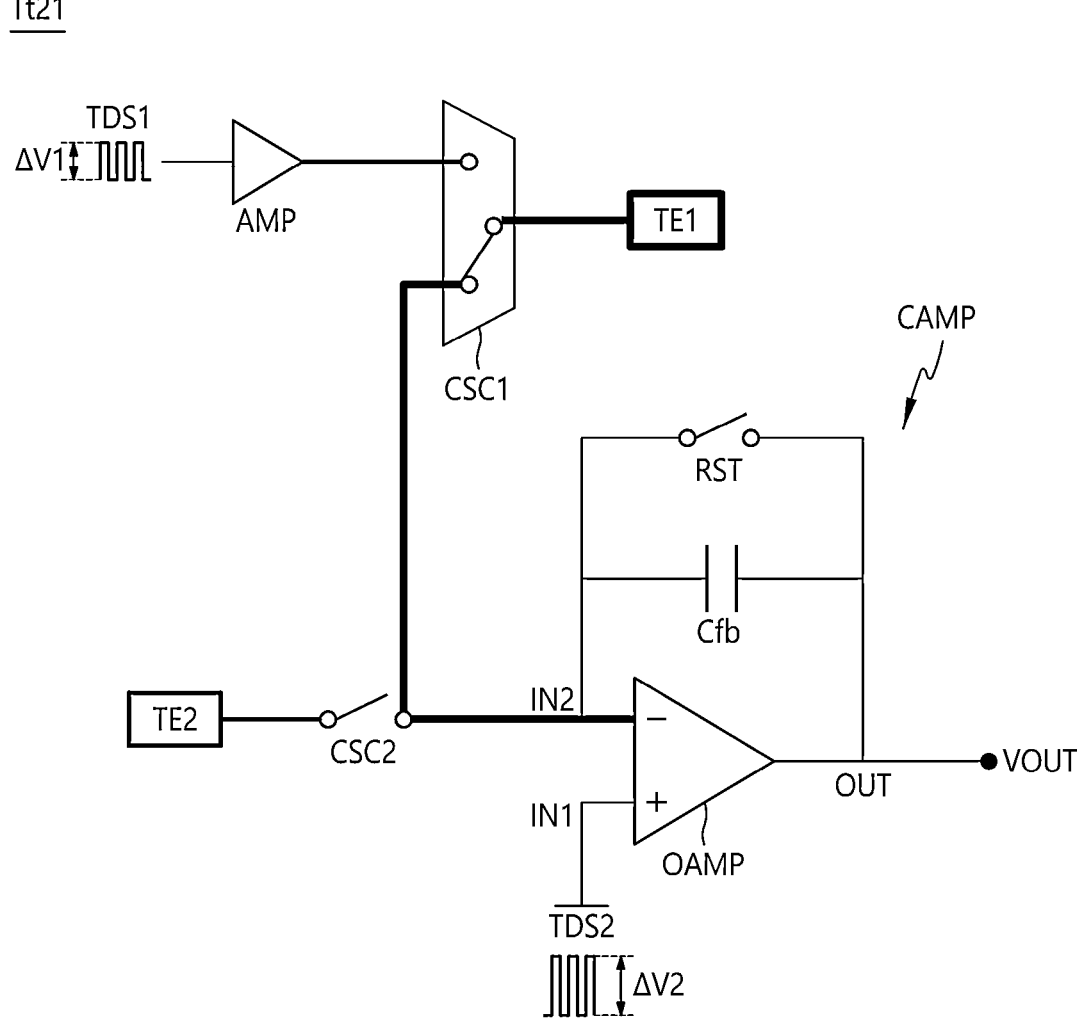
Figure 14:
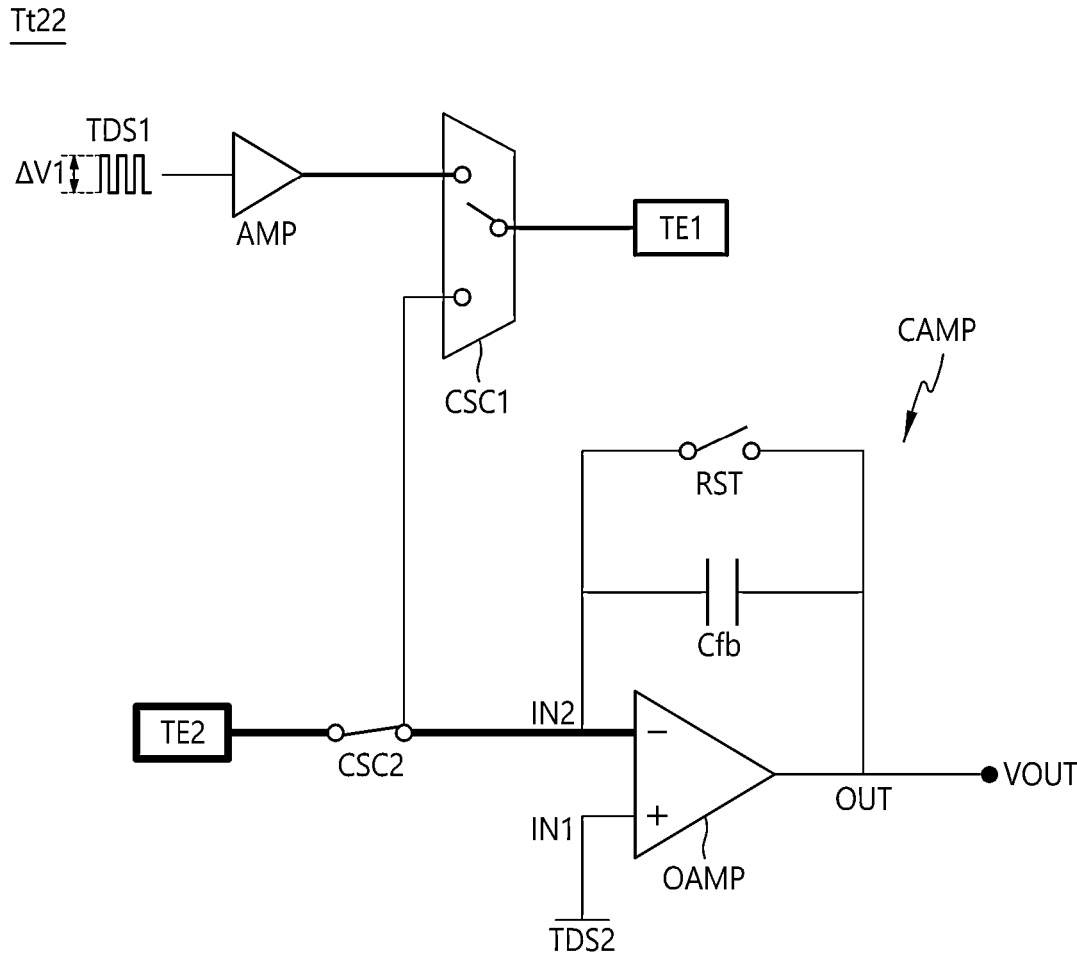

FIGS. 12, 13, and 14 are diagrams briefly illustrating the operation of a touch driving circuit 160 during a touch sensing mode period Tt according to embodiments of the present disclosure.

Referring to FIG. 12, FIG. 13 and FIG. 14, the touch driving circuit 160 can include an amplifier AMP, a charge amplifier CAMP, a first control switch circuit CSC1) and a second control switch circuit CSC2.

The amplifier AMP can be configured to output a first touch driving signal TDS1.

The charge amplifier CAMP can be configured to output a second touch driving signal TDS2.

The first control switch circuit CSC1 can control a first touch electrode TE1 to be connected to the amplifier AMP, or can control a first touch electrode TE1 to be connected to the charge amplifier CAMP, or can control the first touch electrode TE1 not to be connected (i.e., separated) from the amplifier AMP and the charge amplifier CAMP.

The second control switch circuit CSC2 can control the second touch electrode TE2 to be connected to the charge amplifier CAMP, or can control the second touch electrode TE2 to not be connected (i.e., separated from or disconnected) to the charge amplifier CAMP.

Referring to FIG. 12, during the first touch sensing mode period Tt1, the first control switch circuit CSC1 can connect the first touch electrode TE1 and the amplifier AMP. Accordingly, the first touch driving signal TDS1 can be applied to the first touch electrode TE1 through the amplifier AMP.

During the first touch sensing mode period Tt1, the second control switch circuit CSC2 can connect the second touch electrode TE2 and the charge amplifier CAMP. Accordingly, the charge amplifier CAMP can sense the second touch electrode TE2.

Referring to FIG. 13, during the first sub-sensing period Tt21 of the second touch sensing mode period Tt2, the first control switch circuit CSC1 can connect the first touch electrode TE1 to the charge amplifier CAMP.

During the first sub-sensing period Tt21 of the second touch sensing mode period Tt2, the second touch driving signal TDS2 can be input to the first input node IN1 of the charge amplifier CAMP. The second touch driving signal TDS2 input to the first input node IN1 of the charge amplifier CAMP can be applied to the first touch electrode TE1 through the second input node IN2 of the charge amplifier CAMP.

The charge amplifier CAMP can be connected to the second input node IN2, and can sense the first touch electrode TE1 supplied with the second touch driving signal TDS2.

During the first sub-sensing period Tt21 of the second touch sensing mode period Tt2, the second control switch circuit CSC2 can separate two or more second touch electrodes TE2 from two or more charge amplifiers CAMP.

Referring to FIG. 14, during the second sub-sensing period Tt22 of the second touch sensing mode period Tt2, the first control switch circuit CSC1 can separate the first touch electrode TE1 from the amplifier AMP and the charge amplifier AMP.

During a second sub-sensing period Tt22 in a second touch sensing mode period Tt2, a second control switch circuit CSC2 can connect a second touch electrode TE2 to the charge amplifier CAMP.

During a second sub-sensing period Tt22 in a second touch sensing mode period Tt2, a second touch driving signal TDS2 can be input to a first input node IN1 of the charge amplifier CAMP. The second touch driving signal TDS2 input to the first input node IN1 of the charge amplifier CAMP can be applied to the second touch electrode TE2 through a second input node IN2 of the charge amplifier CAMP.

The charge amplifier CAMP can be connected to the second input node IN2, and can sense the second touch electrode TE2 supplied with the second touch driving signal TDS2.

Meanwhile, during the second touch sensing mode period Tt2, the hover touch sensing can be performed in a self-sensing manner. For efficient hover touch sensing, when hover touch sensing is performed in a self-sensing manner, the touch driving circuit 160 can sense two or more touch electrodes TE simultaneously by electrically connecting the two or more touch electrodes TE. For example, for efficient hover touch sensing, the touch driving circuit 160 can sense two or more touch electrodes TE by grouping two or more touch electrodes TE together.

In the embodiments of the present disclosure, when hover touch sensing is performed in a self-sensing manner, the configuration of simultaneously driving and sensing two or more touch electrodes TEs by grouping together can be referred to as a "channel binding driving."

Hereinafter, it will be described in more detail the channel binding driving of the touch display device 100 according to the embodiments of the present disclosure with reference to FIGS. 15 to 19.

Figure 15:
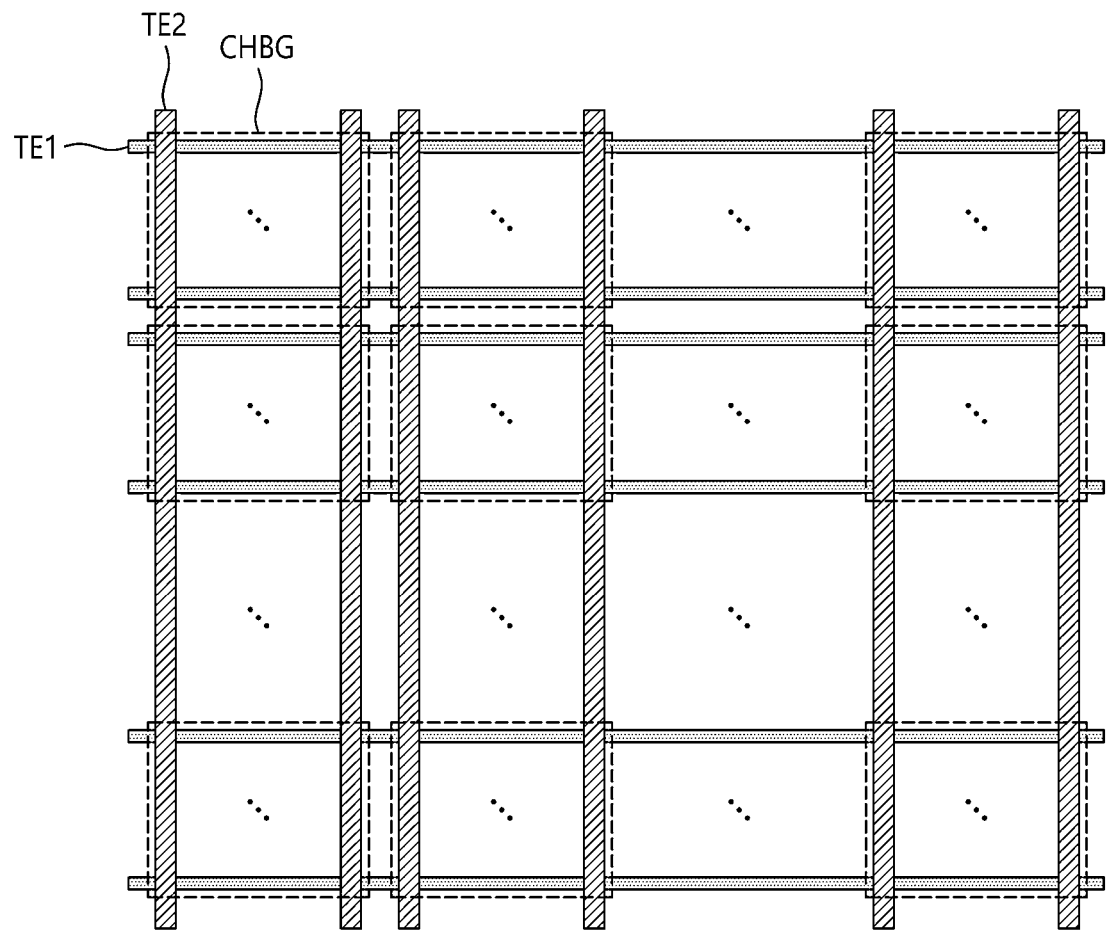
FIG. 15 illustrates a plurality of channel binding group areas included in a touch sensor according to embodiments of the present disclosure.

FIG. 15 illustrates a plurality of channel binding group areas CHBG included in a touch sensor TS according to embodiments of the present disclosure.

Referring to FIG. 15, the touch sensor TS according to the embodiments of the present disclosure can include a plurality of first touch electrodes TE1 and a plurality of second touch electrodes TE2. Each of the plurality of first touch electrodes TE1 can extend in a first direction, and each of the plurality of second touch electrodes TE2 can extend in a second direction different from the first direction. Accordingly, the plurality of first touch electrodes TE1 and the plurality of second touch electrodes TE2 can intersect. For example, the plurality of first touch electrodes TE1 and the plurality of second touch electrodes TE2 may intersect with each other in a mesh form.

The touch sensor TS according to the embodiments of the present disclosure can include a plurality of channel binding group areas CHBG. Each of the plurality of channel binding group areas CHBG can be an area where two or more first touch electrodes TE1 and two or more second touch electrodes TE2 intersect.

Two or more first touch electrodes TE1 can pass through one channel binding group area CHBG in the first direction, and two or more second touch electrodes TE2 can pass through one channel binding group area CHBG in the second direction.

The channel binding driving can be applied when performing the hover touch sensing in a self-sensing manner. However, the channel binding driving can be not applied when performing the contact touch sensing in a mutual-sensing manner.

During the first sub-sensing period Tt21 of the second touch sensing mode period Tt2, in order to sense hover touch in a self-sensing manner, when performing the channel binding driving, two or more first touch electrodes TE1 passing through one channel binding group area CHBG in the first direction can be electrically connected as one large first touch electrode.

During the second sub-sensing period Tt22 of the second touch sensing mode period Tt2, in order to sense the hover touch in a self-sensing manner, when performing the channel binding driving, two or more second touch electrodes TE2 passing through one channel binding group area CHBG in the second direction can be electrically connected as one large second touch electrode.

Hereinafter, it will be described in more detail a touch sensing method (i.e., touch driving method) for two types of touch (e.g., a contact touch and a hover touch) and a channel binding driving method according to the embodiments of the present disclosure with reference to FIGS. 16 to 19.

Figure 16:
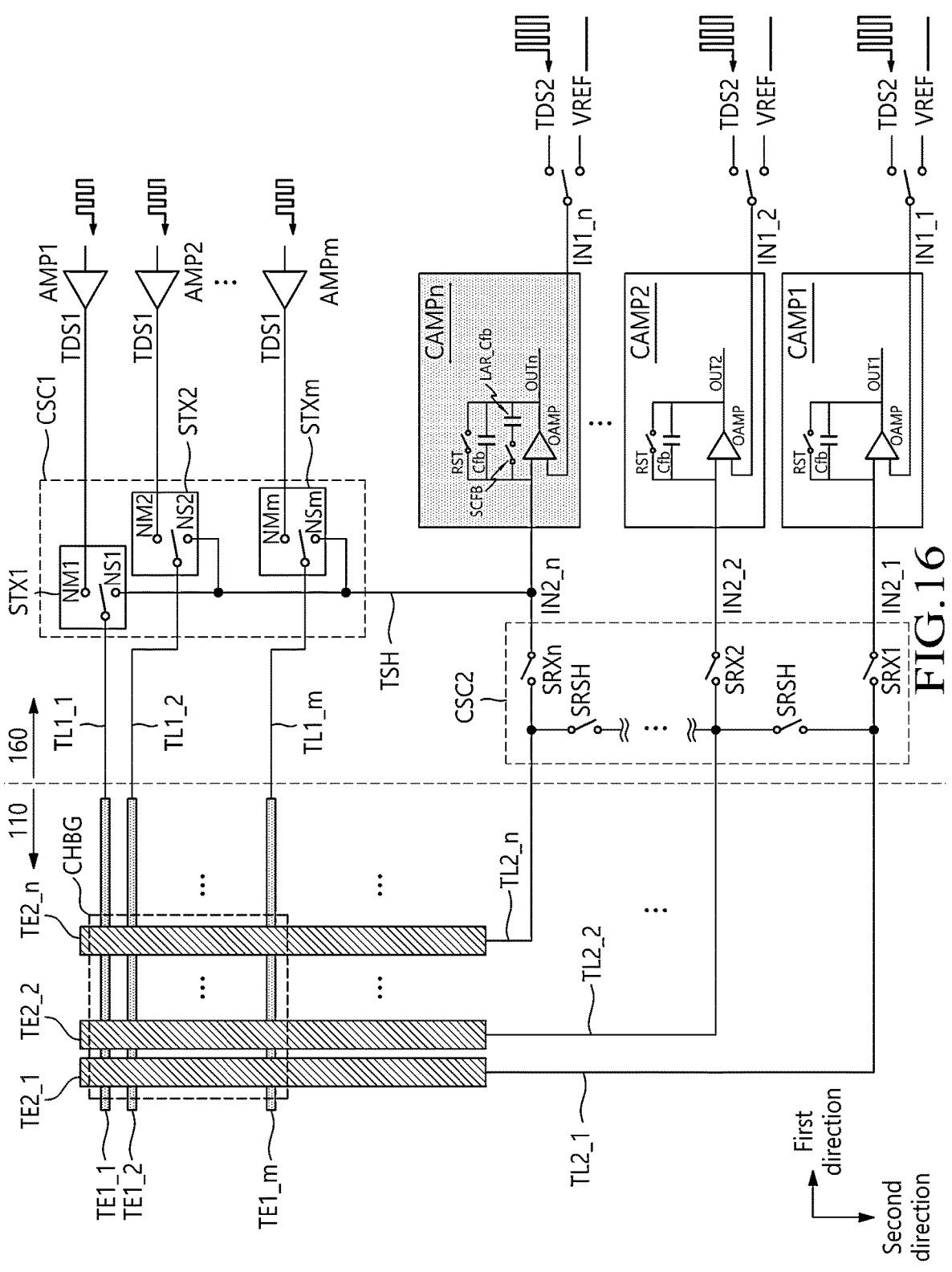
FIG. 16 illustrates a touch driving circuit according to embodiments of the present disclosure.

FIG. 16 illustrates a touch driving circuit 160 according to embodiments of the present disclosure.

Referring to FIG. 16, M first touch electrodes (TE1_1 to TE1_m) can be disposed to pass through one channel binding group area CHBG in the first direction. M first touch lines (TL1_1 to TL1_m) can be connected to M first touch electrodes (TE1_1 to TE1_m). Here, m is a natural number greater than or equal to 2.

Further, N second touch electrodes (TE2_1 to TE2_n) can be disposed to pass through one channel binding group area CHBG in the second direction. N second touch lines (TL2_1 to TL2_n) can be connected to N second touch electrodes (TE2_1 to TE2_n). Here, n is a natural number greater than or equal to 2.

The touch driving circuit 160 can include M amplifiers (AMP1 to AMPm), N charge amplifiers (CAMP1 to CAMPn), a first control switch circuit CSC1, and a second control switch circuit CSC2.

The M amplifiers (AMP1 to AMPm) can correspond to M first touch electrodes (TE1_1 to TE1_m). The M amplifiers (AMP1 to AMPm) can be configured to output a first touch driving signal TDS1 having a first amplitude ΔV1.

The N charge amplifiers (CAMP1 to CAMPn) can correspond to N second touch electrodes (TE2_1 to TE2_n).

Each of the N charge amplifiers (CAMP1 to CAMPn) can include an operational amplifier OAMP and a feedback capacitor Cfb. Each of the operational amplifiers OAMPs of the N charge amplifiers (CAMP1 to CAMPn) can include a first input node (IN1_1 to IN1_$n$), a second input node (IN2_1 to IN2_$n$), and an output node (OUT1 to OUTn).

A reference voltage VREF having constant voltage level or a second touch driving signal TDS2 having a second amplitude $\Delta V2$ can be input to the first input node (IN1_1 to IN1_$n$) of the operational amplifier OAMP of each of the N charge amplifiers (CAMP1 to CAMPn).

The feedback capacitor Cfb of each of N charge amplifiers (CAMP1 to CAMPn) can be connected between the second input node (IN2_1 to IN2_$n$) and the output node (OUT1 to OUTn) of the operational amplifier OAMP. A reset switch RST of each of N charge amplifiers (CAMP1 to CAMPn) can be connected between the second input node (IN2_1 to IN2_$n$) and the output node (OUT1 to OUTn) of the operational amplifier OAMP. For example, the reset switch RST of each of N charge amplifiers (CAMP1 to CAMPn) may be connected between the second input node (IN2_1 to IN2_$n$) and the output node (OUT1 to OUTn) of the operational amplifier OAMP to control connection between the second input node (IN2_1 to IN2_$n$) and the output node (OUT1 to OUTn) of the operational amplifier OAMP.

The first control switch circuit CSC1 can be configured to control the connection between M first touch electrodes (TE1_1 to TEL_$m$) and M amplifiers (AMP1 to AMPm), and the connection between M first touch electrodes (TE1_1 to TE1_$m$) and N charge amplifiers (CAMP1 to CAMPn).

The first control switch circuit CSC1 can control to connect all or part of the M first touch electrodes (TE1_1 to TE1_$m$) to all or part of the M amplifiers (AMP1 to AMPm), or to connect all or part of the M first touch electrodes (TE1_1 to TE1_$m$) to all or part of the N charge amplifiers (CAMP1 to CAMPn), or to separate the M first touch electrodes (TE1_1 to TE1_$m$) from the M amplifiers (AMP1 to AMPm) and the N charge amplifiers (CAMP1 to CAMPn).

The first control switch circuit CSC1 can include M first control switches (STX1 to STXm). Each of the M first control switches (STX1 to STXm) included in the first control switch circuit CSC1 can include M first nodes (NM1 to NMm) connected to M amplifiers (AMP1 to AMPm) and M second nodes (NS1 to NSm) connected to one first shared line TSH.

The M second nodes (NS1 to NSm) of the M first control switches (STX1 to STXm) can be electrically connected to a second input node IN2_$n$ of a specific charge amplifier CAMPn through one first shared line TSH.

During the first touch sensing mode period Tt1, each of the M first control switches (STX1 to STXm) can sequentially or simultaneously electrically connect the M first touch lines (TL1_1 to TL1_$m$) and the M first nodes (NM1 to NMm). In this case, the M first touch lines (TL1_1 to TL1_$m$) can sequentially or simultaneously receive the first touch driving signals TDS1 from the M amplifiers (AMP1 to AMPm).

During a first sub-sensing period Tt21 within the second touch sensing mode periods Tt2, each of the M first control switches (STX1 to STXm) can electrically connect the M first touch lines (TL1_1 to TL1_$m$) and the M second nodes (NS1 to NSm) simultaneously. In this case, the M first touch lines (TL1_1 to TL1_$m$) can be connected to the second input node IN2_$n$ of a specific charge amplifier CAMPn through one first shared line TSH to which the m second nodes (NS1 to NSm) are connected.

Accordingly, the second touch driving signal TDS2 output from the second input node IN2_$n$ of the specific charge amplifier CAMPn can be applied to the M first touch electrodes (TE1_1 to TE1_$m$) through the M first touch lines (TL1_1 to TL1_$m$). The specific charge amplifier CAMPn can sense the M first touch electrodes (TE1_1 to TE1_$m$) through the M first touch lines (TL1_1 to TL1_$m$).

During a second sub-sensing period Tt22 in the second touch sensing mode periods Tt2, each of the M first control switches (STX1 to STXm) can electrically separate or isolate the M first touch lines (TL1_1 to TL1_$m$) from the M first nodes (NM1 to NMm) and the M second nodes (NS1 to NSm).

The second control switch circuit CSC2 can be configured to control the connection between N second touch electrodes (TE2_1 to TE2_$n$) and N charge amplifiers (CAMP1 to CAMPn).

The second control switch circuit CSC2 can control all or part of the N second touch electrodes (TE2_1 to TE2_$n$) to be connected to all or part of the N charge amplifiers (CAMP1 to CAMPn), or control all or part of the N second touch electrodes (TE2_1 to TE2_$n$) to be separated from the N charge amplifiers (CAMP1 to CAMPn).

The second control switch circuit CSC2 can include N second control switches (SRX1 to SRXn) which control the connection between N second touch lines (TL2_1 to TL2_$n$) and second input nodes (IN2_1 to IN2_$n$) of N charge amplifiers (CAMP1 to CAMPn).

The second control switch circuit CSC2 can further include a shared control switch SRSH for controlling the connection between N second touch lines (TL2_1 to TL2_$n$).

Among the N charge amplifiers (CAMP1 to CAMPn), a specific charge amplifier (e.g., CAMPn) can drive and sense one channel binding group area CHBG. In this case, among the N charge amplifiers (CAMP1 to CAMPn), charge amplifiers other than the specific charge amplifier (e.g., CAMPn) may not operate. For example, the specific charge amplifier (e.g., CAMPn) among the N charge amplifiers (CAMP1 to CAMPn), may operate to drive and sense one channel binding group area CHBG. However, the present disclosure is not limited thereto.

During a first sub-sensing period Tt21 in a second touch sensing mode period Tt2, a specific charge amplifier (e.g., CAMPn) among the N charge amplifiers (CAMP1 to CAMPn) can simultaneously drive and simultaneously sense the M first touch electrodes (TE1_1 to TE1_$m$) associated with one channel binding group area CHBG.

During a second sub-sensing period Tt22 in the second touch sensing mode periods Tt2, a specific charge amplifier (e.g., CAMPn) among the N charge amplifiers (CAMP1 to CAMPn) can simultaneously drive and simultaneously sense N second touch electrodes (TE2_1 to TE2_$n$) associated with one channel binding group area CHBG.

A specific charge amplifier (e.g., CAMPn) among the N charge amplifiers (CAMP1 to CAMPn) can further include an additional feedback capacitor LAR_Cfb and a capacitance control switch SCFB connected between a second input node IN2_$n$ and an output node OUTn.

When the capacitance control switch SCFB of a specific charge amplifier (e.g., CAMPn) is turned on, the additional feedback capacitor LAR_Cfb can be connected in parallel with the feedback capacitor Cfb between the second input node IN2 and the output node OUT.

When the capacitance control switch SCFB of a specific charge amplifier (e.g., CAMPn) is turned off, the additional feedback capacitor LAR_Cfb can be disconnected from the feedback capacitor Cfb between the second input node IN2 and the output node OUT of the specific charge amplifier (e.g., CAMPn).

During the first touch sensing mode period Tt1, the capacitance control switch SCFB of a specific charge amplifier (e.g., CAMPn) can be turned off. During the second touch sensing mode period Tt2, the capacitance control switch SCFB of a specific charge amplifier (e.g., CAMPn) can be turned on.

If the shared control switches SRSH of a specific charge amplifier (e.g., CAMPn) are in a turn-off state and the M first touch electrodes (TE1_1 to TE1_m) are connected to the M amplifiers (AMP1 to AMPm) through the M first control switches (STX1 to STXm), the capacitance control switch SCFB of the specific charge amplifier (e.g., CAMPn) can be in a turn-off state.

When the M first touch electrodes (TE1_1 to TE1_m) are connected to a first shared line TSH through the M first control switches (STX1 to STXm), the capacitance control switch SCFB can be in a turn-on state.

When the shared control switches SRSH are in a turn-on state, the capacitance control switch SCFB can be in a turn-on state.

During the first sub-sensing period Tt21, two or more first touch electrodes TE1 among the plurality of first touch electrodes TE1 can be electrically connected to each other. In addition, during the second sub-sensing period Tt22, two or more second touch electrodes TE2 among the plurality of second touch electrodes TE2 can be electrically connected to each other.

Hereinafter, it will be described an operation of the touch driving circuit 160 of FIG. 16 during the first touch sensing mode period Tt1 in more detail with reference to FIG. 17. In addition, it will be described an operation of the touch driving circuit 160 of FIG. 16 during the second touch sensing mode period Tt2 in more detail with reference to FIGS. 18 and 19.

Figure 17:
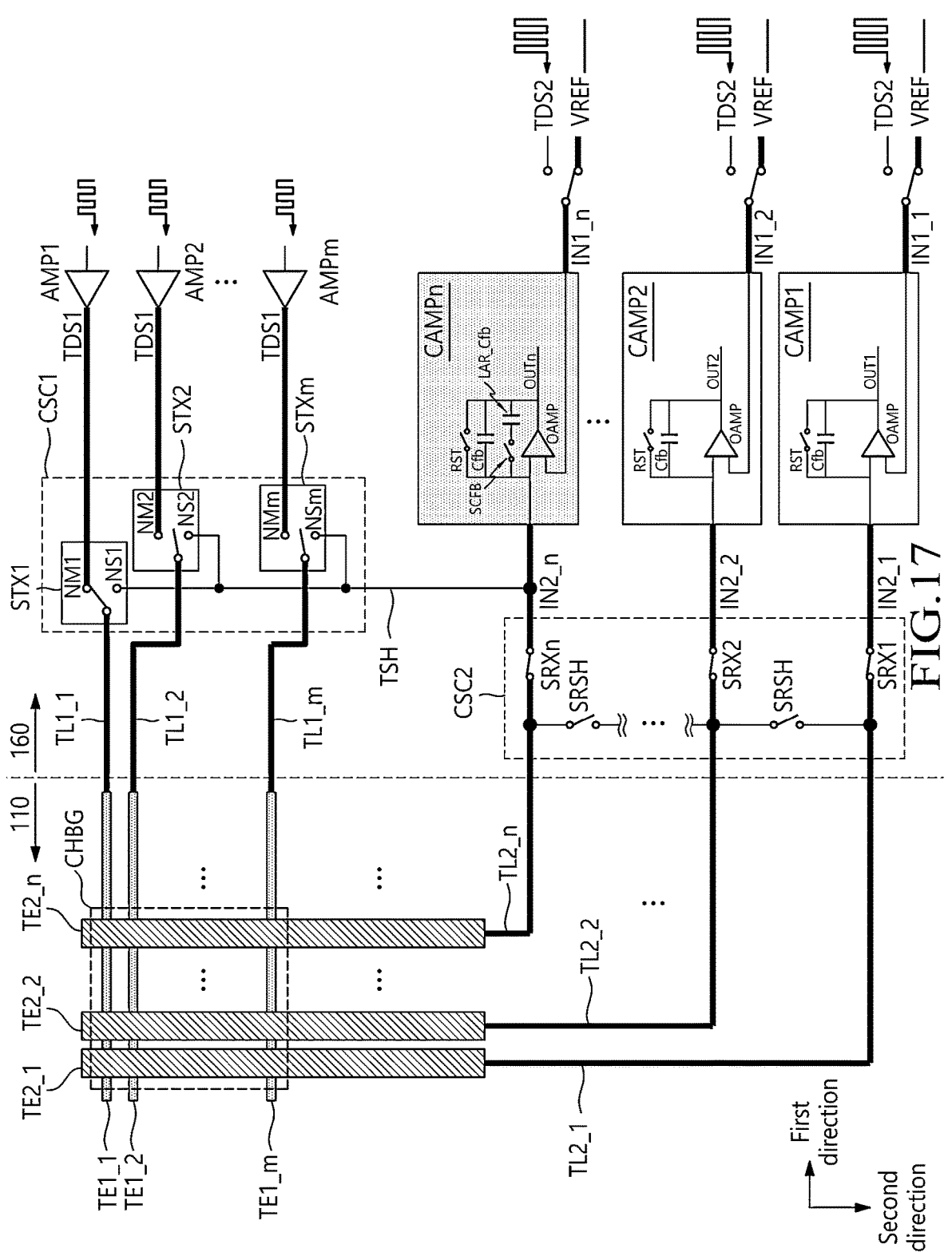
FIG. 17 illustrates a touch driving circuit during a first touch sensing mode period according to embodiments of the present disclosure.

FIG. 17 illustrates a touch driving circuit 160 during a first touch sensing mode period Tt1 according to embodiments of the present disclosure.

Referring to FIG. 17, during the first touch sensing mode period Tt1, a contact touch sensing can be performed in a mutual sensing manner. To this end, the touch driving circuit 160 can supply a first touch driving signal TDS1 to two or more first touch electrodes (TE1_1 to TE1_m) through two or more amplifiers (AMP1 to AMPm), and sense two or more second touch electrodes (TE2_1 to TE2_n) through two or more charge amplifiers (CAMP1 to CAMPn). Here, m can be a natural number greater than or equal to 2, and n can be a natural number greater than or equal to 2.

During the first touch sensing mode period Tt1, the touch driving circuit 160 can sequentially supply the first touch driving signal TDS1 to two or more first touch electrodes (TE1_1 to TE1_m) by sequentially using two or more amplifiers (AMP1 to AMPm). To this end, during the first touch sensing mode period Tt1, the first control switch circuit CSC1 can sequentially connect M first touch electrodes (TE1_1 to TE1_m) and M amplifiers (AMP1 to AMPm) to correspond to each other.

During the first touch sensing mode period Tt1, M first control switches (STX1 to STXm) included in the first control switch circuit CSC1 can sequentially electrically connect M first touch lines (TL1_1 to TL1_m) and M amplifiers (AMP1 to AMPm). For example, as illustrated in FIG. 17, one first control switch STX1 among the M first control switches (STX1 to STXm) can electrically connect the corresponding first touch line TL1_1 and the corresponding amplifier AMP1, and then another first control switch STX2 can electrically connect the corresponding second touch line TL1_2 and the corresponding amplifier AMP2.

During a first touch sensing mode period Tt1, each of the m first control switches (STX1 to STXm) can sequentially connect the M first touch lines (TL1_1 to TL1_m) and the M first nodes (NM1 to NMm). In this case, the M first touch lines (TL1_1 to TL1_m) can sequentially or simultaneously receive the first touch driving signals TDS1 from the M amplifiers (AMP1 to AMPm).

Unlike that illustrated in FIG. 17, during the first touch sensing mode period Tt1, the touch driving circuit 160 can simultaneously supply the first touch driving signal TDS1 to two or more first touch electrodes (TE1_1 to TE1_m) by simultaneously using two or more amplifiers (AMP1 to AMPm). In this case, at least one of the first touch driving signals TDS1 simultaneously supplied to the two or more first touch electrodes (TE1_1 to TE1_m) can have a phase difference from the others. To this end, during the first touch sensing mode period Tt1, the M first control switches (STX1 to STXm) included in the first control switch circuit CSC1 can simultaneously connect the M first touch electrodes (TE1_1 to TE1_m) and the M amplifiers (AMP1 to AMPm). For example, during the first touch sensing mode period Tt1, each of the M first control switches (STX1 to STXm) can simultaneously connect the M first touch lines (TL1_1 to TL1_m) and the M first nodes (NM1 to NMm). In this case, the M first touch lines (TL1_1 to TL1_m) can simultaneously receive the first touch driving signal TDS1 from the M amplifiers (AMP1 to AMPm).

During the first touch sensing mode period Tt1, the second control switch circuit CSC2 can connect the N second touch electrodes (TE2_1 to TE2_n) and the N charge amplifiers (CAMP1 to CAMPn) to correspond to each other.

During the first touch sensing mode period Tt1, the N second control switches (SRX1 to SRXn) can electrically connect N second touch lines (TL2_1 to TL2_n) and second input nodes (IN2_1 to IN2_n) of N charge amplifiers (CAMP1 to CAMPn). In this case, the shared control switches SRSH can be in a turn-off state.

During the first touch sensing mode period Tt1, the M amplifiers (AMP1 to AMPm) can be configured to output a first touch driving signal (TDS1) having a first amplitude ΔV1 to the M first touch electrodes (TE1_1 to TE1_m).

During the first touch sensing mode period Tt1, the N charge amplifiers (CAMP1 to CAMPn) can receive a reference voltage VREF whose voltage level does not change through the first input nodes (IN1_1 to IN1_n).

During the first touch sensing mode period Tt1, the N charge amplifiers (CAMP1 to CAMPn) can sense the N second touch electrodes (TE2_1 to TE2_n) electrically connected to the second input nodes (IN2_1 to IN2_n). For example, during the first touch sensing mode period Tt1, the N charge amplifiers (CAMP1 to CAMPn) can detect or receive the touch sensing signal from each of the N second touch electrodes (TE2_1 to TE2_n) electrically connected to the second input nodes (IN2_1 to IN2_n).

During the first touch sensing mode period Tt1, a capacitance control switch SCFB included in a specific charge amplifier CAMPn can be in a turn-off state. Accordingly, the additional feedback capacitor LAR_Cfb included in the specific charge amplifier CAMPn can be not connected in parallel with the feedback capacitor Cfb, so that the feedback capacitance may not increase.

For example, during the first touch sensing mode period Tt1, the capacitance control switch SCFB of the specific charge amplifier CAMPn can be in a turn-off state. During the first touch sensing mode period Tt1, when the M first touch electrodes (TE1_1 to TE1_m) are connected to the M amplifiers (AMP1 to AMPm) through the M first control switches (STX1 to STXm), the capacitance control switch SCFB of the specific charge amplifier CAMPn can be in a turn-off state.

During the first touch sensing mode period Tt1, when the M first touch electrodes (TE1_1 to TE1_m) are connected to the M amplifiers (AMP1 to AMPm) through the M first control switches (STX1 to STXm), the shared control switches SRSH included in the second control switch circuit CSC2 can be in a turn-off state.

Figure 18:
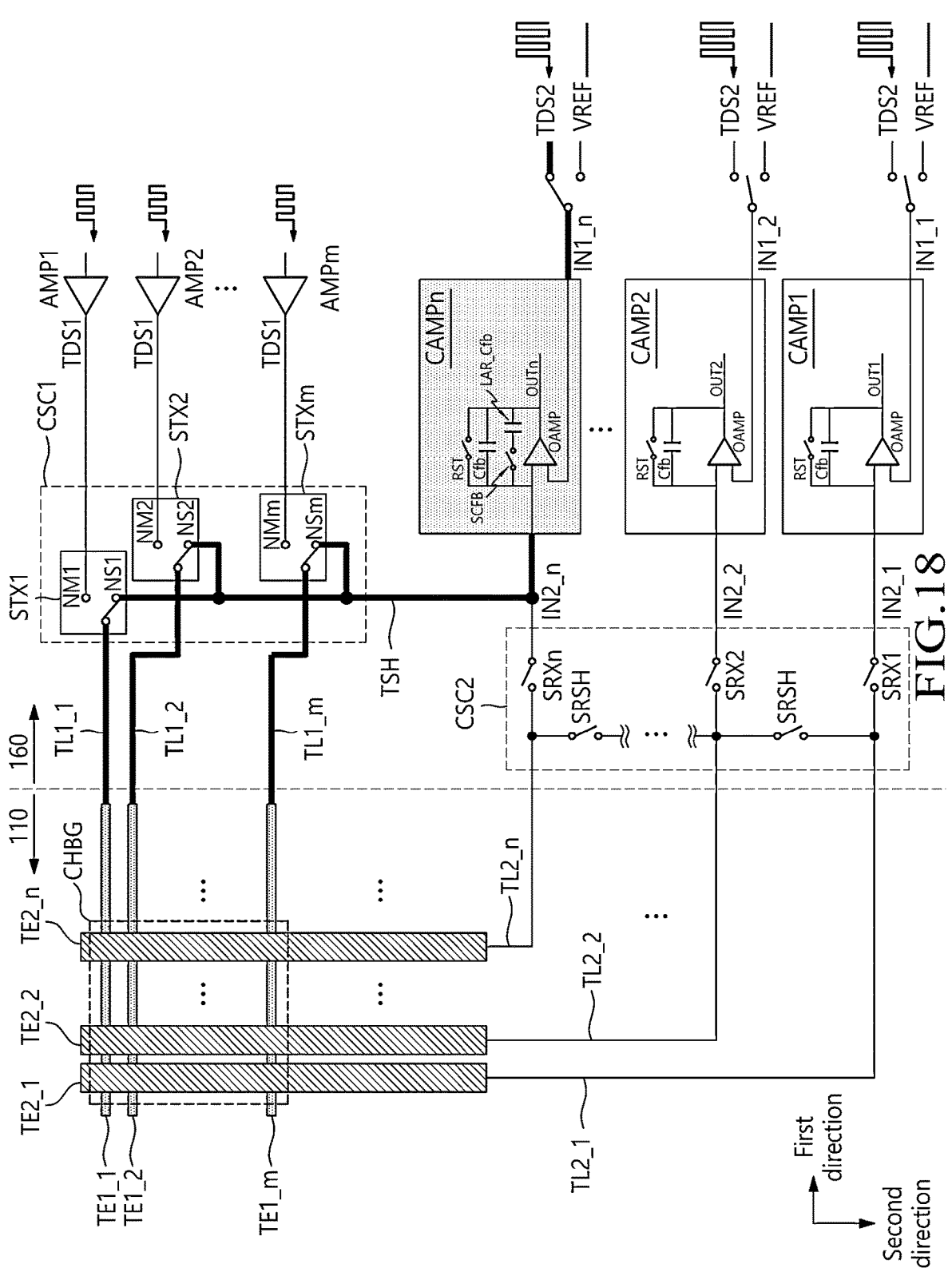
FIG. 18 illustrates a touch driving circuit during a first sub-sensing period of a second touch sensing mode period according to embodiments of the present disclosure.
Figure 19:
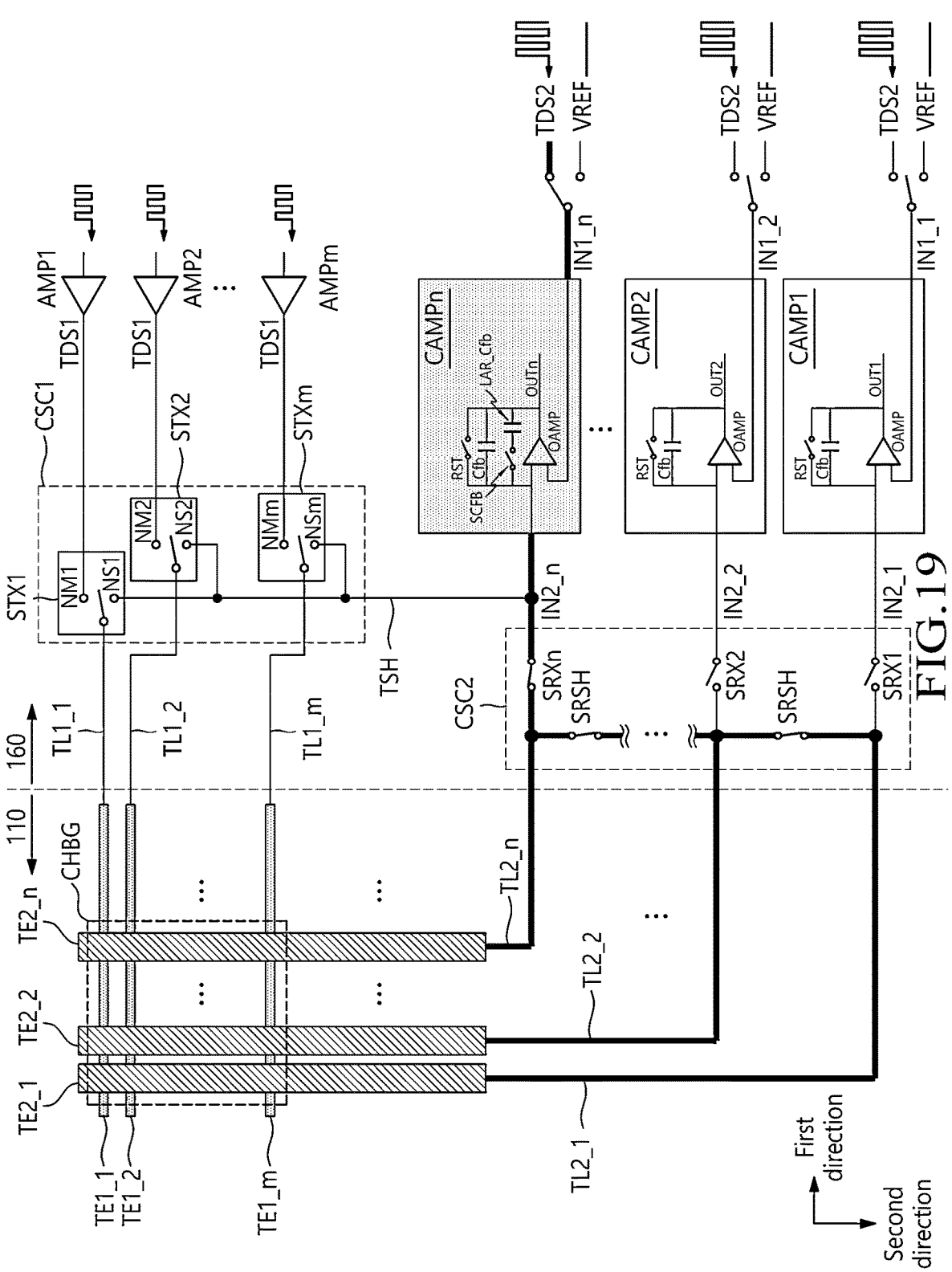
FIG. 19 illustrates a touch driving circuit during a second sub-sensing period within a second touch sensing mode period according to embodiments of the present disclosure.

FIGS. 18 and 19 illustrate a touch driving circuit 160 during a second touch sensing mode period Tt2 according to embodiments of the present disclosure.

Referring to FIG. 18 and FIG. 19, during the second touch sensing mode period Tt2, there can be performed a hover touch sensing in a self-sensing manner.

To this end, as illustrated in FIG. 18, the touch driving circuit 160 can simultaneously supply a first touch driving signal TDS1 to two or more first touch electrodes (TE1_1 to TE1_m) electrically connected to each other through a specific charge amplifier (CAMPn) among two or more charge amplifiers (CAMP1 to CAMPn), and sense two or more first touch electrodes (TE1_1 to TE1_m) electrically connected to each other. Here, the M or m can be a natural number greater than or equal to 2, and the N or n can be a natural number greater than or equal to 2.

Next, as illustrated in FIG. 19, the touch driving circuit 160 can simultaneously supply a first touch driving signal TDS1 to two or more second touch electrodes (TE2_1 to TE2_n) electrically connected to each other through a specific charge amplifier CAMPn among two or more charge amplifiers (CAMP1 to CAMPn), and sense two or more second touch electrodes (TE2_1 to TE2_n) electrically connected to each other. Here, the M or m can be a natural number greater than or equal to 2, and the N or n can be a natural number greater than or equal to 2.

Referring to FIG. 18 and FIG. 19, during the second touch sensing mode period Tt2, a specific charge amplifier CAMPn among the N charge amplifiers (CAMP1 to CAMPn) can supply a second touch driving signal TDS2 to two or more first touch electrodes (TE1_1 to TE1_m) or two or more second touch electrodes (TE2_1 to TE2_n) electrically connected to a second input node IN2_n.

During the second touch sensing mode period Tt2, a specific charge amplifier CAMPn among the n charge amplifiers (CAMP1 to CAMPn) can sense two or more first touch electrodes (TE1_1 to TE1_m) or two or more second touch electrodes (TE2_1 to TE2_n) electrically connected to the second input node IN2_n.

For example, during the second touch sensing mode period Tt2, a specific charge amplifier CAMPn among the n charge amplifiers (CAMP1 to CAMPn) can detect or receive a touch sensing signal from two or more first touch electrodes (TE1_1 to TE1_m) or two or more second touch electrodes (TE2_1 to TE2_n) electrically connected to the second input node IN2_n.

The second touch sensing mode period Tt2 can include a first sub-sensing period Tt21 for sensing a plurality of first touch electrodes TE1 in a channel binding group driving manner, and a second sub-sensing period Tt22 for sensing a plurality of second touch electrodes TE2 in a channel binding group driving manner.

During the second touch sensing mode period Tt2, the capacitance control switch SCFB of the specific charge amplifier CAMPn can be in a turn-on state. During the second touch sensing mode period Tt2, a second touch driving signal TDS2 having a voltage level varying with time and having a second amplitude ΔV2 can be applied to the first input node IN1_n of the specific charge amplifier CAMPn.

As described above, the second touch sensing mode period Tt2 can include the first sub-sensing period Tt21 and the second sub-sensing period (Tt22). Hereinafter, it will be described an operation of the touch driving circuit 160 during the first sub-sensing period Tt21 of the second touch sensing mode period Tt2 with reference to FIG. 18. Next, it will be described an operation of the touch driving circuit 160 during the second sub-sensing period Tt22 of the second touch sensing mode period Tt2 with reference to FIG. 19.

FIG. 18 illustrates the touch driving circuit 160 during the first sub-sensing period Tt21 of the second touch sensing mode period Tt2 according to embodiments of the present disclosure.

Referring to FIG. 18, during the first sub-sensing period Tt21 of the second touch sensing mode period Tt2, there can be performed a hover touch sensing in a self-sensing manner.

To this end, during the first sub-sensing period Tt21 of the second touch sensing mode period Tt2, the touch driving circuit 160 can simultaneously supply a first touch driving signal TDS1 to two or more first touch electrodes (TE1_1 to TE1_m) electrically connected to each other through a specific charge amplifier (AMPn) among two or more charge amplifiers (CAMP1 to CAMPn), and sense two or more first touch electrodes (TE1_1 to TE1_m) electrically connected to each other. Here, the M or m can be a natural number greater than or equal to 2, and the N or n can be a natural number greater than or equal to 2.

During the first sub-sensing period Tt21 of the second touch sensing mode period Tt2, the M amplifiers (AMP1 to AMPm) may not operate.

During the first sub-sensing period Tt21 of the second touch sensing mode period Tt2, each of the M first control switches (STX1 to STXm) can electrically connect the M first touch lines (TL1_1 to TL1_m) and the M second nodes (NS1 to NSm) simultaneously. Accordingly, the M first touch lines (TL1_1 to TL1_m) can be connected to the second input node IN2_n of a specific charge amplifier CAMPn through one first shared line TSH to which the M second nodes (NS1 to NSm) are connected.

During the first sub-sensing period Tt21 of the second touch sensing mode period Tt2, a specific charge amplifier CAMPn among the n charge amplifiers (CAMP1 to CAMPn) can supply a second touch driving signal TDS2 to two or more first touch electrodes (TE1_1 to TE1_m) electrically connected to the second input node IN2_n.

During the first sub-sensing period Tt21 in the second touch sensing mode period Tt2, a specific charge amplifier CAMPn among the N charge amplifiers (CAMP1 to CAMPn) can sense two or more first touch electrodes (TE1_1 to TE1_m) electrically connected together with a second input node IN2_n.

During the first sub-sensing period Tt21 in the second touch sensing mode period Tt2, a plurality of first touch electrodes (TE1_1 to TE1_m) can be driven and sensed using a self-sensing method and a channel binding group driving method.

During the first sub-sensing period Tt21 in the second touch sensing mode period Tt2, the M first control switches (STX1 to STXm) included in a first control switch circuit CSC1 can connect two or more first touch electrodes (TE1_1 to TE1_m) to a specific charge amplifier CAMPn among two or more charge amplifiers (CAMP1 to CAMPn). Accordingly, two or more first touch electrodes (TE1_1 to TE1_m) can be commonly connected to the first shared line TSH.

During the first sub-sensing period Tt21 in the second touch sensing mode period Tt2, the N second control switches (SRX1 to SRXn) included in the second control switch circuit CSC2 can be in a turn-off state. Accordingly, two or more second touch electrodes (TE2_1 to TE2_n) can be electrically disconnected or separated from two or more charge amplifiers (CAMP1 to CAMPn). In this case, the shared control switch SRSH included in the second control switch circuit CSC2 can be in a turn-off state.

During the first sub-sensing period Tt21 in the second touch sensing mode periods Tt2, a specific charge amplifier CAMPn among the N charge amplifiers (CAMP1 to CAMPn) can receive a second touch driving signal TDS2 having a second amplitude ΔV2 through a first input node IN1_n.

During the first sub-sensing period Tt21 in the second touch sensing mode periods Tt2, a specific charge amplifier CAMPn among the N charge amplifiers (CAMP1 to CAMPn) can supply a second touch driving signal TDS2 input through the first input node IN1_n to the M first touch electrodes (TE1_1 to TE1_m) electrically connected together while passing through one channel binding group area CHBG in the first direction, and can sense the M first touch electrodes (TE1_1 to TEL_m) electrically connected together simultaneously.

During the second touch sensing mode period Tt2, a capacitance control switch SCFB of the specific charge amplifier CAMPn can be in the turn-on state. Accordingly, an additional feedback capacitor LAR_Cfb included in the specific charge amplifier CAMPn can be connected in parallel with the feedback capacitor Cfb. Therefore, the feedback capacitance can be increased.

When the M first touch electrodes (TE1_1 to TE1_m) are connected to the first shared line TSH through the M first control switches (STX1 to STXm), the capacitance control switch SCFB of the specific charge amplifier CAMPn can be in the turn-on state.

FIG. 19 illustrates the touch driving circuit 160 during the second sub-sensing period Tt22 of the second touch sensing mode period Tt2 according to embodiments of the present disclosure.

Referring to FIG. 19, a hover touch sensing can be performed in a self-sensing manner during the second sub-sensing period Tt22 in the second touch sensing mode period Tt2.

To this end, during the second sub-sensing period Tt22 of the second touch sensing mode period Tt2, the touch driving circuit 160 can simultaneously supply the first touch driving signal TDS1 to two or more second touch electrodes (TE2_1 to TE2_n) that are electrically connected to each other through a specific charge amplifier CAMPn among two or more charge amplifiers (CAMP1 to CAMPn), and can sense two or more second touch electrodes (TE2_1 to TE2_n) that are electrically connected to each other. Here, the M or m can be a natural number greater than or equal to 2, and the N or n can be a natural number greater than or equal to 2.

During the second sub-sensing period Tt22 of the second touch sensing mode period Tt2, the M amplifiers (AMP1 to AMPm) may not operate.

Accordingly, referring to FIG. 19, during the second sub-sensing period Tt22 in the second touch sensing mode period Tt2, each of the M first control switches (STX1 to STXm) can electrically isolate or separate the M first touch lines (TL1_1 to TL1_m) from both the M first nodes (NM1 to NMm) and the M second nodes (NS1 to NSm).

During the second sub-sensing period Tt22 in the second touch sensing mode period Tt2, a specific charge amplifier CAMPn among the n charge amplifiers (CAMP1 to CAMPn) can supply a second touch driving signal TDS2 to two or more second touch electrodes (TE2_1 to TE2_n) electrically connected together with a second input node IN2_n.

During the second sub-sensing period Tt22 in the second touch sensing mode period Tt2, a specific charge amplifier CAMPn among the N charge amplifiers (CAMP1 to CAMPn) can sense two or more second touch electrodes (TE2_1 to TE2_n) electrically connected together with the second input node IN2_n.

During the second sub-sensing period Tt22 of the second touch sensing mode period Tt2, a plurality of second touch electrodes (TE2_1 to TE2_n) can be driven and sensed using the self-sensing method and the channel binding group driving method.

During the second sub-sensing period Tt22 of the second touch sensing mode period Tt2, M first control switches (STX1 to STXm) included in a first control switch circuit CSC1 can separate two or more first touch electrodes (TE1_1 to TE1_m) from two or more amplifiers (AMP1 to AMPm) and two or more charge amplifiers (CAMP1 to CAMPn).

During the second sub-sensing period Tt22 in the second touch sensing mode period Tt2, a second control switch circuit CSC2 can connect two or more second touch electrodes (TE2_1 to TE2_n) to a specific charge amplifier (CAMPn).

During the second sub-sensing period Tt22 in the second touch sensing mode periods Tt2, all of the shared control switches SRSH included in the second control switch circuit CSC2 can be in a turn-on state. In addition, among the N second control switches (SRX1 to SRXn) included in the second control switch circuit CSC2, only a second control switch SRXn corresponding to the specific charge amplifier CAMPn can be in the turn-on state, and the remaining second control switches (SRX1, SRX2, . . . ) can be turned off.

Accordingly, the second touch electrodes (TE2_1 to TE2_n) can all be electrically connected to each other, and can be connected together to the second input node IN2_n of the specific charge amplifier CAMPn.

During the second sub-sensing period Tt22 in the second touch sensing mode period Tt2, a specific charge amplifier CAMPn among the N charge amplifiers (CAMP1 to CAMPn) can receive a second touch driving signal TDS2 having a second amplitude ΔV2 through a first input node IN1_n.

During the second sub-sensing period Tt22 in the second touch sensing mode period Tt2, a specific charge amplifier CAMPn among n charge amplifiers (CAMP1 to CAMPn) can simultaneously supply the second touch driving signal TDS2 input through a first input node IN1_n to the N second touch electrodes (TE2_1 to TE2_n) passing through one channel binding group area CHBG in a second direction, and can sense the N second touch electrodes (TE2_1 to TE2_n) simultaneously.

During the second touch sensing mode period Tt2, a capacitance control switch SCFB of the specific charge amplifier CAMPn can be turned on. Accordingly, an additional feedback capacitor LAR_Cfb included in the specific charge amplifier CAMPn can be connected in parallel with the feedback capacitor Cfb. Therefore, the feedback capacitance can be increased.

During the second touch sensing mode period Tt2, when the shared control switches SRSH are turned on, the capacitance control switch SCFB of the specific charge amplifier CAMPn can be turned on.

The touch display device 100 according to the embodiments of the present disclosure can be implemented as a wearable device worn on a body (e.g., wrist, head, waist, etc.) or fabric or clothing. For example, a wearable display can include a smart watch, a helmet, gloves, smart clothing, smart glasses, etc.

As described above, the touch display device 100 according to the embodiments of the present disclosure can provide a sensing function for not only a contact touch but also a hover touch. Accordingly, if a wearable device worn on a user's body is implemented with the touch display device 100 according to the embodiments of the present disclosure, the wearable device 2000 can provide various application functions suitable for wearable characteristics through the hover touch sensing in addition to the contact touch sensing.

Embodiments of the present disclosure described above are briefly described as follows.

A touch display device according to embodiments of the present disclosure can include a touch sensor including a plurality of first touch electrodes and a plurality of second touch electrodes, and a touch driving circuit for driving the touch sensor.

An operating mode of the touch display device can include a display mode and a touch sensing mode. The display mode and the touch sensing mode can be switched with each other, or can be performed simultaneously.

The touch sensing mode can include a first touch sensing mode and a second touch sensing mode. The first touch sensing mode and the second touch sensing mode can be performed in temporally separated time periods. For example, the first touch sensing mode and the second touch sensing mode may not temporally overlap with each other.

An operation period of the touch display device can include a first touch sensing mode period in which a first touch driving signal having a first amplitude is applied to the touch sensor, and a second touch sensing mode period in which a second touch driving signal having a second amplitude different from the first amplitude is applied to the touch sensor.

The first touch driving signal can be applied sequentially or simultaneously to the plurality of first touch electrodes during the first touch sensing mode period.

During the second touch sensing mode period, the second touch driving signal can be simultaneously applied to two or more first touch electrodes electrically connected to each other among the plurality of first touch electrodes, or the second touch driving signal can be simultaneously applied to two or more second touch electrodes electrically connected to each other among the plurality of second touch electrodes.

For example, the first touch sensing mode period can be a period for sensing a contact touch which contacts a screen, and the second touch sensing mode period can be a period for sensing a hover touch which does not contact the screen.

The second amplitude of the second touch driving signal in the second touch sensing mode period can be greater than the first amplitude of the first touch driving signal in the first touch sensing mode period.

The second touch sensing mode period can include a first sub-sensing period and a second sub-sensing period which do not overlap with each other.

During the first sub-sensing period within the second touch sensing mode period, the second touch driving signal can be simultaneously applied to two or more first touch electrodes electrically connected to each other among the plurality of first touch electrodes.

During the second sub-sensing period within the second touch sensing mode period, the second touch driving signal can be simultaneously applied to two or more second touch electrodes electrically connected to each other among the plurality of second touch electrodes.

The touch driving circuit can include two or more amplifiers, two or more charge amplifiers, a first control switch circuit and a second control switch circuit The first control switch circuit can be configured for controlling all or part of the two or more first touch electrodes to be connected to all or part of the two or more amplifiers, or controlling all or part of the two or more first touch electrodes to be connected to all or part of the two or more charge amplifiers, or controlling the two or more first touch electrodes to be separated from the two or more amplifiers and the two or more charge amplifiers.

The second control switch circuit can be configured for controlling all or part of the two or more second touch electrodes to be connected to all or part of the two or more charge amplifiers, or controlling all or part of the two or more second touch electrodes to be separated from the two or more charge amplifiers.

The operations of the first control switch circuit and the second control switch circuit are as follows.

During the first touch sensing mode period, the first control switch circuit can sequentially connect the two or more first touch electrodes and the two or more amplifiers in correspondence with each other, and the second control switch circuit can connect the two or more second touch electrodes and the two or more charge amplifiers in correspondence with each other.

During a first sub-sensing period in the second touch sensing mode period, the first control switch circuit can connect the two or more first touch electrodes to a specific charge amplifier among the two or more charge amplifiers, and the second control switch circuit can separate the two or more second touch electrodes from the two or more charge amplifiers.

During a second sub-sensing period in the second touch sensing mode period, the first control switch circuit can separate the two or more first touch electrodes from the two or more amplifiers and the two or more charge amplifiers, and the second control switch circuit can connect the two or more second touch electrodes to the specific charge amplifier.

Each of the two or more charge amplifiers can include an operational amplifier including a first input node, a second input node and an output node, and a feedback capacitor between the second input node and the output node.

Among the two or more charge amplifiers, the remaining charge amplifiers except for a specific charge amplifier can operate only during the first touch sensing mode period.

Among the two or more charge amplifiers, the specific charge amplifier can operate during both the first touch sensing mode period and the second touch sensing mode period.

However, an operation of the specific charge amplifier during the second touch sensing mode period can be different from an operation of the specific charge amplifier during the first touch sensing mode period.

During the first touch sensing mode period, the operation of the specific charge amplifier can be the same as the operation of the remaining charge amplifiers except for the specific charge amplifier among the two or more charge amplifiers.

The specific charge amplifier can further include an additional feedback capacitor between the second input node and the output node, and a capacitance control switch controlling a connection between one of the second input node and the output node and the additional feedback capacitor.

When the capacitance control switch is turned on, the additional feedback capacitor can be connected in parallel with the feedback capacitor between the second input node and the output node.

When the capacitance control switch is turned off, the additional feedback capacitor can be disconnected from the feedback capacitor between the second input node and the output node.

During the first touch sensing mode period, the capacitance control switch can be in a turn-off state, and a reference voltage whose voltage level does not change with time can be applied to the first input node of each of the two or more charge amplifiers.

During the second touch sensing mode period, the capacitance control switch can be in a turn-on state, and a second touch driving signal having a voltage level changing with time and having the second amplitude can be applied to the first input node of the specific charge amplifier.

The touch display device according to embodiments of the present disclosure can further include a display panel including a plurality of subpixels and the touch sensor, a display driving circuit for driving the plurality of subpixels, a display controller for controlling the display driving circuit and supplying a first mode control signal to a touch controller, and the touch controller for supplying a second mode control signal to the touch driving circuit.

An operation period of the touch display device can include a display mode period and a touch sensing mode period, and the touch sensing mode period can include the first touch sensing mode period and the second touch sensing mode period.

The display mode period, the first touch sensing mode period and the second touch sensing mode period can be distinguished by the first mode control signal and the second mode control signal.

The first mode control signal can be a control signal for distinguishing between the display mode period and the touch sensing mode period, and the second mode control signal can be a control signal for distinguishing between the first touch sensing mode period and the second touch sensing mode period.

For example, the first mode control signal can be a vertical synchronization signal for dividing one display frame period into an active period and a blank period, and the active period can be the display mode period, and the blank period can be the touch sensing mode period.

For example, the second mode control signal can be a hover enable signal for enabling a hover touch sensing mode, which is a second touch sensing mode.

For example, the first mode control signal can include a first signal section having a first level voltage and a second signal section having a second level voltage different from the first level voltage, and the second mode control signal can include a third signal section having a third level voltage and a fourth signal section having a fourth level voltage different from the third level voltage.

For example, during the display mode period, the first mode control signal can have the second level voltage and the second mode control signal can have the third level voltage.

For example, during the first touch sensing mode period, the first mode control signal can have the first level voltage and the second mode control signal can have the third level voltage.

For example, during the second touch sensing mode period, the first mode control signal can have the first level voltage and the second mode control signal can have the fourth level voltage.

A touch display device according to embodiments of the present disclosure can include a display panel including a plurality of subpixels and a plurality of touch electrodes, a display driving circuit for driving the plurality of subpixels, a touch driving circuit for supplying a touch driving signal to at least one of the plurality of touch electrodes, a display controller for controlling the display driving circuit and supplying a first mode control signal to a touch controller, and the touch controller for supplying a second mode control signal to the touch driving circuit.

An operation period of the touch display device can include a display mode period and a touch sensing mode period, and the touch sensing mode period can include a first touch sensing mode period and a second touch sensing mode period.

The display mode period, the first touch sensing mode period and the second touch sensing mode period can be distinguished by the first mode control signal and the second mode control signal.

The first mode control signal can include a first signal section having a first level voltage and a second signal section having a second level voltage different from the first level voltage, and the second mode control signal can include a third signal section having a third level voltage and a fourth signal section having a fourth level voltage different from the third level voltage.

During the display mode period, the first mode control signal can have the second level voltage and the second mode control signal can have the third level voltage, During the first touch sensing mode period, the first mode control signal can have the first level voltage and the second mode control signal can have the third level voltage, During the second touch sensing mode period, the first mode control signal can have the first level voltage and the second mode control signal can have the fourth level voltage.

The first mode control signal can be a control signal for dividing the operation period into the display mode period and the touch sensing mode period, and the second mode control signal can be a control signal for dividing the touch sensing mode period into the first touch sensing mode period and the second touch sensing mode period.

A touch driving circuit according to embodiments of the present disclosure can include two or more amplifiers corresponding to a plurality of first touch electrodes, two or more charge amplifiers corresponding to a plurality of second touch electrodes and each including a feedback capacitor, a first control switch circuit which controls all or part of the plurality of first touch electrodes to be connected to all or part of the two or more amplifiers, or controls all or part of the plurality of first touch electrodes to be connected to all or part of the two or more charge amplifiers, or controls the plurality of first touch electrodes to be separated from the two or more amplifiers and the two or more charge amplifiers, and a second control switch circuit which controls all or part of the plurality of second touch electrodes to be connected to all or part of the two or more charge amplifiers, or controls all or part of the plurality of second touch electrodes to be separated from the two or more charge amplifiers.

An operation period of the touch driving circuit can include a first touch sensing mode period and a second touch sensing mode period which do not overlap with each other, and the second touch sensing mode period can include a first sub-sensing period and a second sub-sensing period which do not overlap with each other.

During the first sub-sensing period, two or more first touch electrodes among the plurality of first touch electrodes can be electrically connected to each other. In addition, during the second sub-sensing period, two or more second touch electrodes among the plurality of second touch electrodes can be electrically connected to each other.

During the first touch sensing mode period, the first control switch circuit can sequentially connect the two or more first touch electrodes and the two or more amplifiers in correspondence with each other, and the second control switch circuit can connect the two or more second touch electrodes and the two or more charge amplifiers in correspondence with each other.

The second touch sensing mode period can include a first sub-sensing period and a second sub-sensing period which do not overlap with each other.

During the first sub-sensing period, the first control switch circuit can connect the two or more first touch electrodes to a specific charge amplifier among the two or more charge amplifiers, and the second control switch circuit can separate the two or more second touch electrodes from the two or more charge amplifiers.

During the second sub-sensing period, the first control switch circuit can separate the two or more first touch electrodes from the two or more amplifiers and the two or more charge amplifiers, and the second control switch circuit can connect the two or more second touch electrodes to the specific charge amplifier.

Each of the two or more charge amplifiers can further include an operational amplifier including a first input node, a second input node and an output node.

The feedback capacitor can be connected between the second input node and the output node.

The specific charge amplifier can further include an additional feedback capacitor and a capacitance control switch connected between the second input node and the output node.

If the capacitance control switch is turned on, the additional feedback capacitor can be connected in parallel with the feedback capacitor between the second input node and the output node.

If the capacitance control switch is turned off, the additional feedback capacitor can be disconnected from the feedback capacitor between the second input node and the output node.

A touch driving circuit according to embodiments of the present disclosure can include a first signal input unit configured to receive a reference touch driving signal and a touch mode control signal, and a first signal output unit configured to output a first touch driving signal having a first amplitude or a second touch driving signal having a second amplitude different from the first amplitude to a touch sensor based on the reference touch driving signal and the touch mode control signal.

During the first touch sensing mode period, the two or more amplifiers are configured to output a first touch driving signal having a first amplitude to the first touch electrodes.

During the second touch sensing mode period, a second touch driving signal having a voltage level varying with time and having a second amplitude is applied to a first input node of a specific charge amplifier among the two or more charge amplifiers.

During the first sub-sensing period, the specific charge amplifier among the two or more charge amplifiers receives the second touch driving signal having the second amplitude through the first input node.

During the second sub-sensing period, the specific charge amplifier among the two or more charge amplifiers receives the second touch driving signal having the second amplitude through the first input node.

The second amplitude is greater than the first amplitude.

The touch mode control signal can have a first level voltage or a second level voltage.

If the touch mode control signal has a first level voltage, at one point in time, the first touch driving signal can be applied to N touch electrodes among a plurality of touch electrodes included in the touch sensor.

If the touch mode control signal has a second level voltage, at one point in time, the second touch driving signal can be simultaneously applied to M touch electrodes, which are more than N, among a plurality of touch electrodes included in the touch sensor.

A touch controller for controlling a touch sensing operation of a touch display device according to embodiments of the present disclosure can include a second signal input unit configured to receive a first mode control signal from a display controller, and a second signal output unit configured to output a reference touch driving signal and output a second mode control signal generated based on the first mode control signal.

The first mode control signal can include a first signal section having a first level voltage and a second signal section having a second level voltage different from the first level voltage.

If the first mode control signal is a second signal section having a second level voltage, the second mode control signal can have a third level voltage.

If the first mode control signal is a first signal section having a first level voltage, the second mode control signal can include a signal section having a third level voltage and a signal section having a fourth level voltage different from the third level voltage.

According to embodiments of the present disclosure as described above, it is possible to provide a touch display device, a touch driving circuit and touch controller capable of supporting a plurality of touch sensing modes.

According to embodiments of the present disclosure, it is possible to provide a touch display device, a touch driving circuit and touch controller capable of efficiently sensing a contact touch and a hover touch.

According to embodiments of the present disclosure, it is possible to provide a touch display device, a touch driving circuit and touch controller having a circuit structure and a control structure capable of efficiently sensing a contact touch and a hover touch.

According to embodiments of the present disclosure, it is possible to provide a touch display device, a touch driving circuit and touch controller having a control signal system capable of efficiently supporting a display mode, a contact touch sensing mode, and a hover touch sensing mode.

According to embodiments of the present disclosure, it is possible to provide a touch display device, a touch driving circuit and touch controller capable of low-power operation by efficiently performing a display driving, a contact touch sensing, and a hover touch sensing in terms of driving time.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

What is claimed is:

1. A touch display device comprising:
a touch sensor including a plurality of first touch electrodes and a plurality of second touch electrodes; and
a touch driving circuit configured to drive the touch sensor,
wherein an operation period of the touch display device includes a first touch sensing mode period in which a first touch driving signal having a first amplitude is applied to the touch sensor, and a second touch sensing mode period in which a second touch driving signal having a second amplitude is applied to the touch sensor, the second amplitude being different from the first amplitude,
wherein the first touch driving signal is applied sequentially or simultaneously to the plurality of first touch electrodes during the first touch sensing mode period, and
wherein, during the second touch sensing mode period, the second touch driving signal is simultaneously applied to two or more first touch electrodes electrically connected to each other among the plurality of first touch electrodes, or the second touch driving signal is simultaneously applied to two or more second touch electrodes electrically connected to each other among the plurality of second touch electrodes,
wherein the second touch sensing mode period includes a first sub-sensing period and a second sub-sensing period which do not overlap with each other,
wherein, during the first sub-sensing period within the second touch sensing mode period, the second touch driving signal is simultaneously applied to at least two first touch electrodes electrically connected to each other among the plurality of first touch electrodes, and
wherein, during the second sub-sensing period within the second touch sensing mode period, the second touch driving signal is simultaneously applied to at least two second touch electrodes electrically connected to each other among the plurality of second touch electrodes.

2. The touch display device of claim 1, wherein the second amplitude is greater than the first amplitude.

3. The touch display device of claim 1, wherein the touch driving circuit includes:
two or more amplifiers;
two or more charge amplifiers;
a first control switch circuit configured to control all or part of the two or more first touch electrodes to be connected to all or part of the two or more amplifiers, or control all or part of the two or more first touch electrodes to be connected to all or part of the two or more charge amplifiers, or control the two or more first touch electrodes to be separated from the two or more amplifiers and the two or more charge amplifiers; and
a second control switch circuit configured to control all or part of the two or more second touch electrodes to be connected to all or part of the two or more charge amplifiers, or control all or part of the two or more second touch electrodes to be separated from the two or more charge amplifiers.

4. The touch display device of claim 3, wherein, during the first touch sensing mode period, the first control switch circuit sequentially connects the two or more first touch electrodes and the two or more amplifiers in correspondence with each other, and the second control switch circuit connects the two or more second touch electrodes and the two or more charge amplifiers in correspondence with each other,
wherein, during the first sub-sensing period, the first control switch circuit connects the two or more first touch electrodes to a specific charge amplifier among the two or more charge amplifiers, and the second control switch circuit separates the two or more second touch electrodes from the two or more charge amplifiers, and
wherein, during the second sub-sensing period, the first control switch circuit separates the two or more first touch electrodes from the two or more amplifiers and the two or more charge amplifiers, and the second control switch circuit connects the two or more second touch electrodes to the specific charge amplifier.

5. The touch display device of claim 4, wherein each of the two or more charge amplifiers includes an operational amplifier including a first input node, a second input node and an output node, and a feedback capacitor between the second input node and the output node,
wherein the specific charge amplifier further includes an additional feedback capacitor between the second input node and the output node, and a capacitance control switch for controlling a connection between one of the second input node and the output node and the additional feedback capacitor,
wherein, when the capacitance control switch is turned on, the additional feedback capacitor is connected in parallel with the feedback capacitor between the second input node and the output node, and
wherein, when the capacitance control switch is turned off, the additional feedback capacitor is disconnected from the feedback capacitor between the second input node and the output node.

6. The touch display device of claim 5, wherein, during the first touch sensing mode period, the capacitance control switch is in a turn-off state, and a reference voltage whose voltage level does not change with time is applied to the first input node of each of the two or more charge amplifiers, and
wherein, during the second touch sensing mode period, the capacitance control switch is in a turn-on state, and a second touch driving signal having a voltage level changing with time and having the second amplitude is applied to the first input node of the specific charge amplifier.

7. The touch display device of claim 1, further comprising:
a display panel including a plurality of subpixels and the touch sensor;
a display driving circuit configured to drive the plurality of subpixels;

a display controller configured to control the display driving circuit and supply a first mode control signal to a touch controller; and the touch controller configured to supply a second mode control signal to the touch driving circuit, wherein an operation period of the touch display device includes a display mode period and a touch sensing mode period, wherein the touch sensing mode period includes the first touch sensing mode period and the second touch sensing mode period, and wherein the display mode period, the first touch sensing mode period and the second touch sensing mode period are distinguished by the first mode control signal and the second mode control signal.

8. The touch display device of claim 7, wherein the first mode control signal is a control signal for distinguishing between the display mode period and the touch sensing mode period, and the second mode control signal is a control signal for distinguishing between the first touch sensing mode period and the second touch sensing mode period.

9. The touch display device of claim 7, wherein the first mode control signal is a vertical synchronization signal for dividing one display frame period into an active period and a blank period, the active period is the display mode period, and the blank period is the touch sensing mode period, and wherein the second mode control signal is a hover enable signal for enabling a hover touch sensing mode, which is a second touch sensing mode.

10. The touch display device of claim 7, wherein the first mode control signal includes a first signal section having a first level voltage and a second signal section having a second level voltage different from the first level voltage, and the second mode control signal includes a third signal section having a third level voltage and a fourth signal section having a fourth level voltage different from the third level voltage, wherein, during the display mode period, the first mode control signal has the second level voltage and the second mode control signal has the third level voltage, wherein, during the first touch sensing mode period, the first mode control signal has the first level voltage and the second mode control signal has the third level voltage, and wherein, during the second touch sensing mode period, the first mode control signal has the first level voltage and the second mode control signal has the fourth level voltage.

11. The touch display device of claim 1, wherein the first touch sensing mode period is a period for sensing a contact touch which contacts a screen, and the second touch sensing mode period is a period for sensing a hover touch which does not contact the screen.

12. A touch display device comprising:

a display panel including a plurality of subpixels and a plurality of touch electrodes;

a display driving circuit configured to drive the plurality of subpixels;

a touch driving circuit configured to supply a touch driving signal to at least one of the plurality of touch electrodes;

a display controller configured to control the display driving circuit and supply a first mode control signal to a touch controller; and the touch controller configured to supply a second mode control signal to the touch driving circuit, wherein an operation period of the touch display device includes a display mode period and a touch sensing mode period, wherein the touch sensing mode period includes a first touch sensing mode period and a second touch sensing mode period, and wherein the display mode period, the first touch sensing mode period and the second touch sensing mode period are distinguished by the first mode control signal and the second mode control signal.

13. The touch display device of claim 12, wherein the first mode control signal includes a first signal section having a first level voltage and a second signal section having a second level voltage different from the first level voltage, and the second mode control signal includes a third signal section having a third level voltage and a fourth signal section having a fourth level voltage different from the third level voltage, wherein, during the display mode period, the first mode control signal has the second level voltage and the second mode control signal has the third level voltage, wherein, during the first touch sensing mode period, the first mode control signal has the first level voltage and the second mode control signal has the third level voltage, and wherein, during the second touch sensing mode period, the first mode control signal has the first level voltage and the second mode control signal has the fourth level voltage.

14. The touch display device of claim 12, wherein the first mode control signal is a control signal for dividing the operation period into the display mode period and the touch sensing mode period, and the second mode control signal is a control signal for dividing the touch sensing mode period into the first touch sensing mode period and the second touch sensing mode period.

15. A touch driving circuit comprising:

two or more amplifiers corresponding to a plurality of first touch electrodes;

two or more charge amplifiers corresponding to a plurality of second touch electrodes, each of the two or more charge amplifiers including a feedback capacitor;

a first control switch circuit configured to control all or part of the plurality of first touch electrodes to be connected to all or part of the two or more amplifiers, or control all or part of the plurality of first touch electrodes to be connected to all or part of the two or more charge amplifiers, or control the plurality of first touch electrodes to be separated from the two or more amplifiers and the two or more charge amplifiers; and a second control switch circuit configured to control all or part of the plurality of second touch electrodes to be connected to all or part of the two or more charge amplifiers, or control all or part of the plurality of second touch electrodes to be separated from the two or more charge amplifiers, wherein an operation period of the touch driving circuit includes a first touch sensing mode period and a second touch sensing mode period which do not overlap with each other, and the second touch sensing mode period includes a first sub-sensing period and a second sub-sensing period which do not overlap with each other, wherein, during the first sub-sensing period, two or more first touch electrodes among the plurality of first touch electrodes are electrically connected to each other, and wherein, during the second sub-sensing period, two or more second touch electrodes among the plurality of second touch electrodes are electrically connected to each other.

16. The touch driving circuit of claim 15, wherein during the first touch sensing mode period, the two or more amplifiers are configured to output a first touch driving signal having a first amplitude to the first touch electrodes.

17. The touch driving circuit of claim 16, wherein during the second touch sensing mode period, a second touch driving signal having a voltage level varying with time and having a second amplitude is applied to a first input node of a specific charge amplifier among the two or more charge amplifiers.

18. The touch driving circuit of claim 15, wherein, during the first touch sensing mode period, the first control switch circuit sequentially connects the two or more first touch electrodes and the two or more amplifiers in correspondence with each other, and the second control switch circuit connects the two or more second touch electrodes and the two or more charge amplifiers in correspondence with each other, wherein, during the first sub-sensing period, the first control switch circuit connects the two or more first touch electrodes to a specific charge amplifier among the two or more charge amplifiers, and the second control switch circuit separates the two or more second touch electrodes from the two or more charge amplifiers, and wherein, during the second sub-sensing period, the first control switch circuit separates the two or more first touch electrodes from the two or more amplifiers and the two or more charge amplifiers, and the second control switch circuit connects the two or more second touch electrodes to the specific charge amplifier.

19. The touch driving circuit of claim 18, wherein each of the two or more charge amplifiers further includes an operational amplifier including a first input node, a second input node and an output node, wherein the feedback capacitor is connected between the second input node and the output node, wherein the specific charge amplifier further includes an additional feedback capacitor and a capacitance control switch connected between the second input node and the output node, wherein, when the capacitance control switch is turned on, the additional feedback capacitor is connected in parallel with the feedback capacitor between the second input node and the output node, and wherein, when the capacitance control switch is turned off, the additional feedback capacitor is disconnected from the feedback capacitor between the second input node and the output node.

\* \* \* \* \*